(12) United States Patent
Ishibashi

(10) Patent No.: US 11,881,785 B2
(45) Date of Patent: Jan. 23, 2024

(54) POWER CONVERSION DEVICE WITH EXPANDED SOFT SWITCHING REGION AND SIMPLIFIED CONTROL

(71) Applicant: Mitsubishi Electric Corporation, Tokyo (JP)

(72) Inventor: Takaharu Ishibashi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 87 days.

(21) Appl. No.: 17/438,936

(22) PCT Filed: May 7, 2019

(86) PCT No.: PCT/JP2019/018278
§ 371 (c)(1),
(2) Date: Sep. 14, 2021

(87) PCT Pub. No.: WO2020/225854
PCT Pub. Date: Nov. 12, 2020

(65) Prior Publication Data
US 2022/0158563 A1 May 19, 2022

(51) Int. Cl.
*H02M 3/335* (2006.01)
*H02M 1/00* (2006.01)
*H02M 1/38* (2007.01)

(52) U.S. Cl.
CPC ..... *H02M 3/33573* (2021.05); *H02M 1/0058* (2021.05); *H02M 1/38* (2013.01); *H02M 3/33584* (2013.01)

(58) Field of Classification Search
CPC ......... H02M 3/33573; H02M 3/33569; H02M 3/335; H02M 3/33584; H02M 1/0058
See application file for complete search history.

(56) References Cited

U.S. PATENT DOCUMENTS 9,455,641 B2 * 9/2016 Kondo .............. H02M 3/33584
2011/0249472 A1 10/2011 Jain et al.
(Continued)

FOREIGN PATENT DOCUMENTS

JP 2013-27201 A 2/2013
JP 2013251998 A * 12/2013
(Continued)

OTHER PUBLICATIONS

Japanese Office Action dated Sep. 20, 2022 in corresponding Japanese Patent Application No. 2021-518234 (with English translation), 11 pages.
(Continued)

*Primary Examiner* — Gustavo A Rosario-Benitez
(74) *Attorney, Agent, or Firm* — XSENSUS LLP

(57) ABSTRACT

A first bridge circuit executes power conversion between a first DC voltage and a first alternating current voltage of a primary-side winding of a transformer. A second bridge circuit executes the power conversion between a second DC voltage and a second AC voltage of a secondary winding of the transformer. A control circuit controls on and off of switching elements so that a zero voltage period is provided in only one of the first AC voltage and the second AC voltage. A length of the zero voltage period is determined so that charging and discharging of a snubber capacitor is completed during a dead time in which the on and off of a positive-side switching element and a negative-side switching element of each switching arm are switched in a bridge circuit on a side outputting an AC voltage in which the zero voltage period is not provided.

19 Claims, 9 Drawing Sheets

(56) References Cited

U.S. PATENT DOCUMENTS

| | | | |
|---|---|---|---|
| 2018/0054136 A1 | 2/2018 | Jimichi et al. | |
| 2019/0214916 A1* | 7/2019 | Takahara | H02M 7/53871 |
| 2020/0144926 A1* | 5/2020 | Murakami | H02M 3/33573 |
| 2020/0366198 A1* | 11/2020 | Watanabe | H02M 3/33546 |
| 2021/0175808 A1* | 6/2021 | Nakahara | H02M 3/33576 |
| 2021/0249962 A1* | 8/2021 | Watanabe | H02M 1/0054 |

FOREIGN PATENT DOCUMENTS

| | | | |
|---|---|---|---|
| JP | 2015-12750 A | 1/2015 | |
| JP | 2016-12969 A | 1/2016 | |
| JP | WO2016/152366 A1 | 6/2017 | |
| WO | WO-2018061286 A1 * | 4/2018 | H02M 1/083 |

OTHER PUBLICATIONS

International Search Report and Written Opinion dated Jul. 16, 2019, received for PCT Application PCT/JP2019/018278, Filed on May 7, 2019, 7 pages including English Translation.

Extended European search report dated Apr. 7, 2022, in corresponding European patent Application No. 19927701.3, 10 pages.

* cited by examiner

POWER CONVERSION DEVICE WITH EXPANDED SOFT SWITCHING REGION AND SIMPLIFIED CONTROL

CROSS-REFERENCE TO RELATED APPLICATION

The present application is based on PCT filing PCT/JP2019/018278, filed May 7, 2019, the entire contents of which are incorporated herein by reference.

TECHNICAL FIELD

The present disclosure relates to a power conversion device.

A power conversion device including a bridge circuit in which a semiconductor switching element is used is known. The bridge circuit converts DC power into AC power or AC power into DC power by on and off control of the semiconductor switching element. FIG. 2 of Japanese Patent Laying-Open No. 2015-12750 (PTL 1) describes the power conversion device that executes power transmission between DC voltage sources by connecting the bridge circuit to each of a primary side and a secondary side of a transformer.

In the power conversion device of PTL 1, a zero voltage period is provided in the AC voltage input to the transformer, thereby expanding an operation region in which soft switching is possible.

CITATION LIST

Patent Literature

PTL 1: Japanese Patent Laying-Open No. 2015-12750

SUMMARY OF INVENTION

Technical Problem

However, in the power conversion device of PTL 1, the region in which soft switching can be applied is expanded by controlling two variables of a control angle controlling power and a phase period controlling the zero voltage period. As a result, transmission power becomes a two-variable function of the control angle and the phase period, and the phase period becomes a function of the control angle. As a result, because the control angle and the phase period that become the control variables interfere with each other, it is difficult to uniquely determine both the control angle and the phase period, and there is a concern about complication of control.

The present disclosure has been made to solve such a problem, and an object of the present disclosure is to provide a highly efficient power conversion device capable of executing the power conversion with the expanded soft switching region without complicating control.

Solution to Problem

In one aspect of the present disclosure, a power conversion device includes a first DC terminal, a second DC terminal, a transformer, a first bridge circuit, a second bridge circuit, and a control circuit. The transformer includes a first winding and a second winding that are magnetically coupled. The first bridge circuit is connected between the first DC terminal and a first AC terminal connected to the first winding, and executes power conversion between a first DC voltage of the first DC terminal and a first AC voltage of the first AC terminal. The second bridge circuit is connected between the second DC terminal and a second AC terminal connected to the second winding, and executes power conversion between a second DC voltage of the second DC terminal and a second AC voltage of the second AC terminal. Each of the first and second bridge circuits includes a plurality of switching legs connected in parallel. Each of the plurality of switching legs includes a positive-side switching element and a negative-side switching element connected in series, and a snubber capacitor. The snubber capacitor is connected in parallel to each of the positive-side switching element and the negative-side switching element. The control circuit controls on and off of each of the positive-side switching elements and each of the negative-side switching elements in the first and second bridge circuits. The control circuit alternately turns on and off the positive-side switching element and the negative-side switching element after a dead time having a predetermined length is provided in each switching leg. The power conversion device has a first operation mode in which power transmission is executed between the first DC terminal and the second DC terminal. In the first operation mode, the control circuit controls on and off of each of the positive-side switching elements and each of the negative-side switching elements of the first and second bridge circuits so that a first phase difference between switching phases of the first bridge circuit and the second bridge circuit is provided in order to control transmission power, and a zero voltage period is provided in one of the first AC voltage and the second AC voltage, while the zero voltage period is not provided in the other of the first AC voltage and the second AC voltage. In the first operation mode, a length of the zero voltage period is determined such that charging and discharging of the snubber capacitor are completed during the dead time in each of the switching legs of one of the first and second bridge circuits that outputs the other of the first AC voltage and the second AC voltage.

Advantageous Effects of Invention

According to the present disclosure, the zero voltage period is provided only in one of the first AC voltage and the second AC voltage from the first bridge circuit and the second bridge circuit, and the length of the zero voltage period is set in accordance with a condition that the zero volt switching is possible, so that the zero voltage period length and the first phase difference for the power transmission control can be individually obtained. As a result, a highly efficient power conversion device capable of executing the power conversion in which a soft switching region is expanded can be provided without complicating the control.

DESCRIPTION OF EMBODIMENTS

Figure 1:
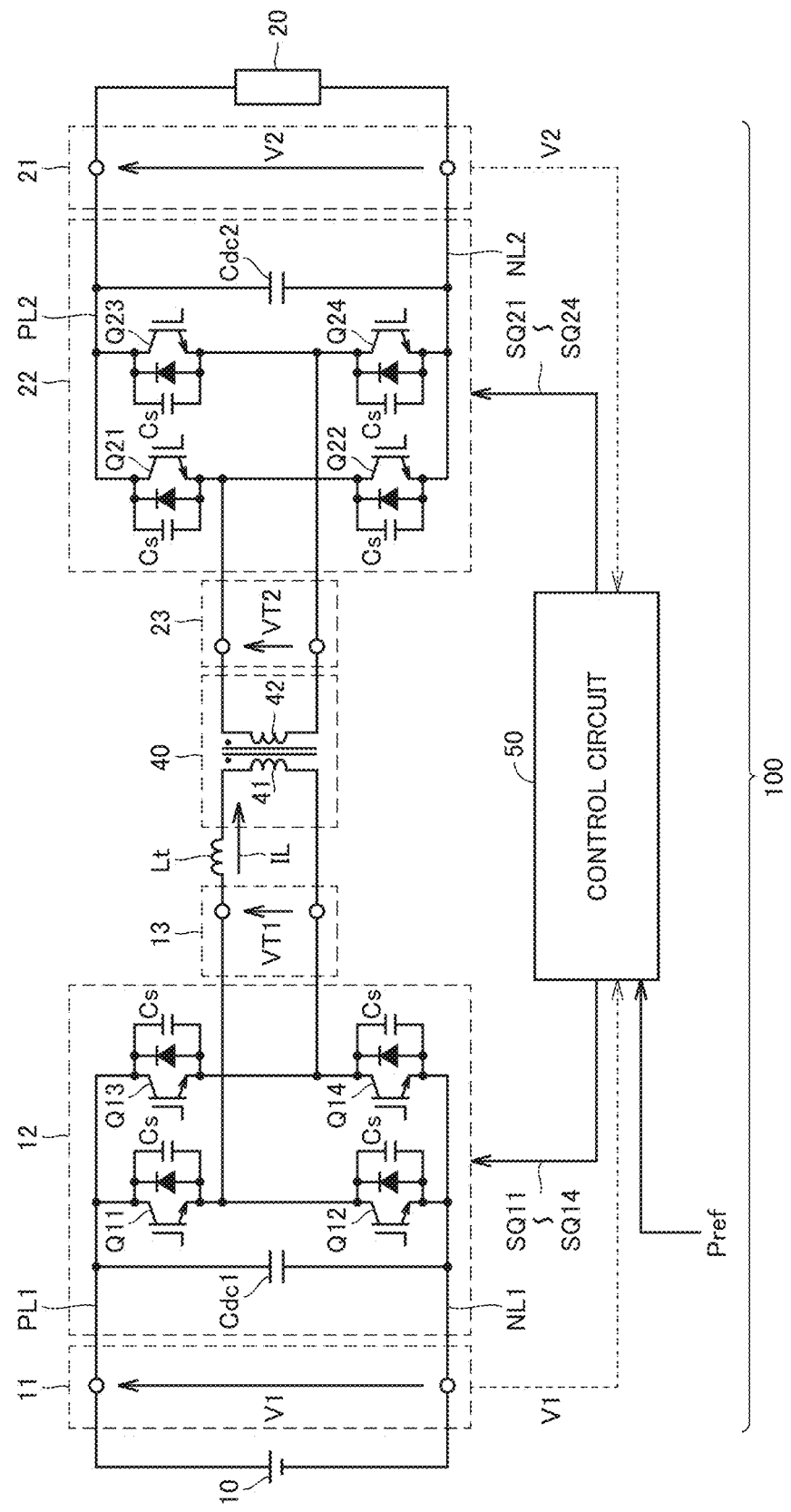
FIG. 1 is a circuit diagram illustrating a configuration example of a power conversion device according to a first embodiment.

Hereinafter, an embodiment of the present disclosure will be described in detail with reference to the drawings. Although a plurality of embodiments will be described below, it is planned from the beginning of the application to that the configurations of the embodiments are appropriately combined. In the drawings, the same or corresponding portion is denoted by the same reference numeral, and the description thereof will not generally be repeated.

First Embodiment

FIG. 1 is a circuit diagram illustrating a configuration example of a power conversion device according to the first embodiment. The configuration in FIG. 1 is merely an example, and the control of the embodiment described later can be applied to a power conversion device that executes DC/DC conversion using a plurality of bridge circuits and transformers.

Referring to FIG. 1, a power conversion device 100 according to the first embodiment includes a first DC terminal 11, a first bridge circuit 12, a first AC terminal 13, a second DC terminal 21, a second bridge circuit 22, a second AC terminal 23, and a transformer 40.

First DC terminal 11 is connected to a DC power supply 10. A positive-side terminal of first DC terminal 11 is connected to a positive-side power line PL1. A negative-side terminal of first DC terminal 11 is connected to a negative-side power line NL1. A DC voltage V1 between the positive-side terminal and the negative-side terminal of first DC terminal 11 is detected by a sensor (not illustrated).

First bridge circuit 12 includes a DC capacitor Cdc1 connected between power lines PL1 and NL1 and semiconductor switching elements (hereinafter, also simply referred to as a "switching element") Q11 to Q14.

Switching elements Q11 and Q12 are connected in series between power lines PL1 and NL1 to constitute a first switching leg. Switching elements Q13 and Q14 are connected in series between power lines PL1 and NL1 to constitute a second switching leg. A midpoint between the first and second switching legs connected in parallel, namely, a connection node of switching elements Q11 and Q12 and a connection node of switching elements Q13 and Q14 are connected to first AC terminal 13. First AC terminal 13 is connected to a primary-side winding 41 of transformer 40.

Second DC terminal 21 is connected to a load 20. The positive-side terminal of second DC terminal 21 is connected to a positive-side power line PL2. The negative-side terminal of the second DC terminal 21 is connected to the negative-side power line NL2. A DC voltage V2 between the positive-side terminal and the negative-side terminal of second DC terminal 21 is detected by a sensor (not illustrated).

Second bridge circuit 22 includes a DC capacitor Cdc2 connected between power lines PL2 and NL2 and semiconductor switching elements (hereinafter, also simply referred to as a "switching element") Q21 to Q24.

An electrolytic capacitor, a film capacitor, or the like can be used as DC capacitors Cdc1, Cdc2. A high-frequency current flows through DC capacitors Cdc1, Cdc2, but a life can be extended by suppressing degradation due to the high-frequency current when a film capacitor is used.

Switching elements Q21 and Q22 are connected in series between power lines PL2 and NL2 to constitute a third switching leg. Switching elements Q23 and Q24 are connected in series between power lines PL1 and NL1 to constitute a fourth switching leg. A midpoint between the third and fourth switching legs connected in parallel, namely, the connection node between switching elements Q21 and Q22 and the connection node between switching elements Q23 and Q24 are connected to second AC terminal 23. Second AC terminal 23 is connected to a secondary-side winding 42 of transformer 40.

For example, a semiconductor switching element having a self-turn-off function such as an IGBT (Insulated Gate Bipolar Transistor) in which diodes are connected in anti-parallel or a MOSFET (Metal Oxide Semiconductor Field Effect Transistor) can be applied as switching elements Q11 to Q14 and Q21 to Q24. Switching elements Q11 to Q14 and Q21 to Q24 may be used by combining a plurality of semiconductor switching elements in parallel depending on the current capacity. A snubber capacitor Cs is connected in parallel to each of switching elements Q11 to Q14 and Q21 to Q24. Hereinafter, a capacitance value of the snubber capacitor is also referred to as Cs.

A control circuit 50 generates gate signals SQ11 to SQ14 executing on and off control of switching elements Q11 to Q14 of the first bridge circuit and gate signals SQ21 to SQ24 executing on and off control of switching elements Q21 to Q24 of the second bridge circuit.

First bridge circuit 12 executes DC/AC voltage conversion between DC voltage V1 of first DC terminal 11 and an AC voltage VT1 of first AC terminal 13 by the on and off control of switching elements Q11 to Q14 in accordance with gate signals SQ11 to SQ14.

Second bridge circuit 22 executes DC/AC voltage conversion between DC voltage V2 of second DC terminal 21 and an AC voltage VT2 of second AC terminal 23 by the on and off control of switching elements Q21 to Q24 in accordance with gate signals SQ21 to SQ24.

Transformer 40 has primary-side winding 41 and secondary-side winding 42 that are magnetically coupled, and primary-side winding 41 and secondary-side winding 42 are electrically insulated from each other. When a turn ratio between primary-side winding 41 (the number of turns N1) and secondary-side winding 42 (the number of turns N2) is N (N=N2/N1), a relationship of VT2=VT1×N holds between AC voltages VT1 and VT2. When turn ratio N of transformer 40 is equal to the ratio of DC voltages V1 and V2, efficiency is most improved. Therefore, turn ratio N is preferably determined corresponding to the ratio of rated voltages of DC power supply 10 and load 20. In the following description, secondary-side DC voltage V2 means a primary-side converted value (V2/N) in which turn ratio N of transformer 40 is used.

As described above, the power transmission by the DC/DC conversion of DC voltages V1 and V2 can be executed between first DC terminal 11 (DC power supply 10) and second DC terminal 21 (load 20) using first bridge circuit 12, transformer 40, and second bridge circuit 22.

Based on a transmission power command value Pref and DC voltages V1 and V2, control circuit 50 generates gate signals SQ11 to SQ14, SQ21 to SQ24 so as to control a power transmission amount between first DC terminal 11 (DC power supply 10) and second DC terminal 21 (load 20) in accordance with transmission power command value Pref.

Control circuit 50 may be configured by a digital electronic circuit such as an arithmetic processing device and a storage device or an analog electronic circuit such as a comparator, an operational amplifier, and a differential amplifier circuit as long as control circuit 50 has a control arithmetic function and a gate signal generation function, which are described later herein. Alternatively, control circuit 50 may be configured by both the digital electronic circuit and the analog electronic circuit.

An inductance element Lt exists between first bridge circuit 12 and second bridge circuit 22 and transformer 40. For example, inductance element Lt can be configured using leakage inductance of transformer 40. Alternatively, in order to adjust an inductance value, inductance element Lt can be configured with connection of an inductive element such as a reactor.

In the power conversion in first bridge circuit 12 and second bridge circuit 22, semiconductor switching elements Q11 to Q14 and Q21 to Q24 can execute zero voltage switching that is soft switching by action of inductance element Lt. The soft switching is a technique of reducing voltage or current applied to a switching element during a switching transient period to decrease a switching loss and an electromagnetic noise.

The switching loss can be reduced by turning on and off switching elements Q11 to Q24 by the soft switching, and resultantly transformer 40 can be downsized by increasing an operation frequency (switching frequency).

When the operating frequency of each of switching elements Q11 to Q14 and Q21 to Q24 is increased (for example, 61 Hz or more) in order to downsize transformer 40, a material of an iron core constituting transformer 40 is an amorphous material, a silicon steel plate having a silicon content of 6.5%, or a silicon steel plate having a thickness of about 0.1 mm, whereby an increase in loss due to the increase in frequency can be suppressed.

The on and off control of semiconductor switching elements Q11 to Q14 and Q21 to Q24 in power conversion device 100 of the first embodiment will be described below. As described below, in power conversion device 100 of the first embodiment, by providing a zero voltage period equivalent to that of PTL 1 only in one of first bridge circuit 12 and second bridge circuit 22, high efficiency can be executed by reducing power loss generated in the switching element while complication of control is avoided. In the first embodiment, the power conversion in which the zero voltage period is provided in first bridge circuit 12 will be described.

Figure 2:
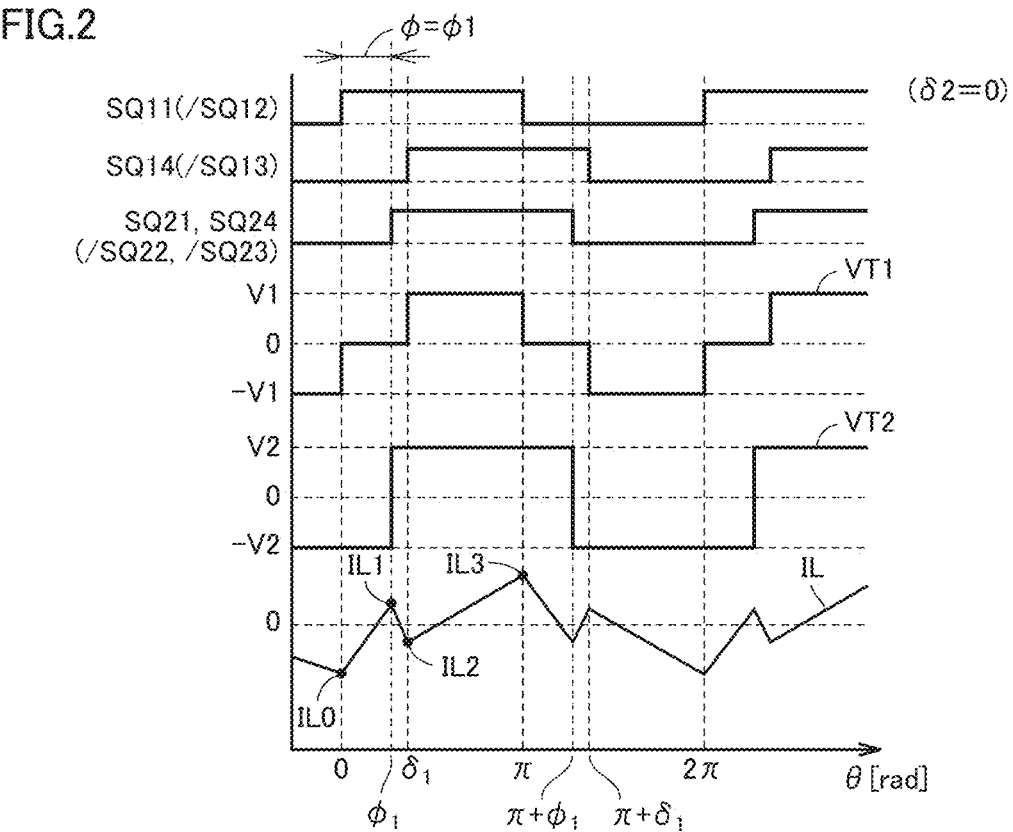
FIG. 2 is a waveform chart illustrating an example of on and off control of a switching element in the power conversion device of the first embodiment.

FIG. 2 is a waveform chart illustrating an example of the on and off control of switching elements Q11 to Q14 and Q21 to Q24 in the power conversion device of the first embodiment.

FIG. 2 illustrates gate signals SQ11 to SQ14, SQ21 to SQ24 of switching elements Q11 to Q14 and Q21 to Q24, primary-side AC voltage VT1 and secondary-side AC voltage VT2 of transformer 40 controlled by the gate signals, and an alternating current IL flowing through first bridge circuit 12 and second bridge circuit 22 through transformer 40 with a phase θ [rad] as a horizontal axis. A period length from θ=0 to θ=2π corresponds to a switching cycle Tsw (a reciprocal of the switching frequency) of each of switching elements Q11 to Q14 and Q21 to Q24.

Each of gate signals SQ11 to SQ14, SQ21 to SQ24 is a pulse signal that repeats transition between a logic high level (hereinafter, also simply referred to as "H-level") and a logic low level (hereinafter, also simply referred to as "L-level"). Hereinafter, it is assumed that each switching element is turned on during an H-level period of the corresponding gate signal, and is turned off during an L-level period. Hereinafter, an inverted signal of each gate signal will be described by adding "/" to the beginning. For example, a gate signal /SQ12 means the inverted signal of gate signal SQ12.

In each switching leg, the positive-side switching element (Q11, Q13, Q21, Q23) and the negative-side switching element (Q12, Q14, Q22, Q24) are alternately turned on and off at equal intervals. For this reason, for example, gate signal SQ11 and gate signal /SQ12 are represented by the same signal, and gate signal SQ14 and the gate signal /SQ13 are represented by the same signal.

However, although not illustrated in FIG. 2, actually a dead time TD having a predetermined length is provided in order to prevent a short circuit between the terminals of DC capacitors Cdc1, Cdc2 when the on and off of the positive-side and negative-side switching elements are switched in each switching leg. Hereinafter, a period length of the dead time is also referred to as TD. During the dead time, both the gate signal of the positive-side switching element and the gate signal of the negative-side switching element are set to the L-level, and both the positive-side switching and the negative-side switching are turned off. In each switching leg, the soft switching is executed when charging and discharging operation of snubber capacitor Cs connected in parallel to the switching element is completed during dead time TD.

As illustrated in FIG. 2, in the first embodiment, a phase difference δ1 is provided between gate signal SQ11 (/SQ12) of switching elements Q11, Q12 and gate signal SQ14 (/SQ13) of switching elements Q13 and Q14 in first bridge circuit 12. Specifically, phase difference δ1 is provided to gate signal SQ14 of switching element Q14 with reference to gate signal SQ11 of switching element Q11. That is, in first bridge circuit 12, phase difference δ1 is provided between phases in which the on and off are switched between the positive-side and negative-side switching elements between the switching legs. That is, in the first embodiment, phase difference δ1 corresponds to an example of a "second phase difference". As a result, AC voltage VT1 output from first bridge circuit 12 to first AC terminal 13 has amplitude V1 and the zero voltage period corresponding to phase difference δ1.

On the other hand, in the first embodiment, a phase difference is not provided between gate signal SQ21 (/SQ22) of switching elements Q21 and Q22 and gate signal SQ24 (/SQ23) of switching elements Q23 and Q24 in the second bridge circuit 22. That is, in second bridge circuit 22, phases at which the on and off are switched between the positive-side and negative-side switching elements are the same between the switching legs, switching elements Q21 and Q24 are switched on and off at the same timing, and switching elements Q22 and Q23 are switched on and off at the same timing. For this reason, AC voltage VT2 output from second bridge circuit 22 to second AC terminal 23 has amplitude V2 and does not have the zero voltage period.

A phase difference ϕ for controlling the power transmission is provided between a switching phase of first bridge circuit 12 and a switching phase of second bridge circuit 22. In the first embodiment, the phase of gate signal SQ11 of switching element Q11 is defined as a "switching phase" of first bridge circuit 12, and the phase of gate signal SQ21 of switching element Q21 is defined as a "switching phase" of second bridge circuit 22.

In the first embodiment, a phase difference ϕ1 is provided between gate signal SQ11 of switching element Q11 and gate signal SQ21 of switching element Q21 (ϕ=ϕ1). As a result, phase difference ϕ1 exists between AC voltage VT1 and AC voltage VT2. In the first embodiment, phase difference ϕ1 corresponds to an example of a "first phase difference". As illustrated in FIG. 2, by setting ϕ1<δ1, the zero voltage period longer than phase difference ϕ can be secured for the purpose of the power transmission control.

At this point, alternating current IL (θ) at phase θ is obtained at each phase. As illustrated in FIG. 2, IL (0)=IL0, IL (ϕ1)=IL1, IL (δ1)=IL2, and IL (π)=IL3.

First, in a phase period of 0<θ<ϕ1, because of VT1=0 and VT2=−V2, alternating current IL (θ) is expressed by the following equation (1) using a switching frequency fsw of each of switching elements Q11 to Q14 and Q21 to Q24 and an inductance value L of inductance element Lt.

[Mathematical Formula 1]

$$IL(\theta) = \frac{V2}{2\pi \cdot fsw \cdot L} \cdot \theta + IL0 \quad (1)$$

Then, in the phase period of ϕ1<θ<δ1, because of VT1=0 and VT2=V2, alternating current IL (θ) is expressed by the following equation (2).

[Mathematical Formula 2]

$$IL(\theta) = -\frac{V2}{2\pi \cdot fsw \cdot L} \cdot (\theta - \phi1) + IL1 \quad (2)$$

Similarly, in the phase period of δ1<θ<π, because of VT1=V1 and VT2=V2, alternating current IL (θ) is expressed by the following equation (3).

[Mathematical Formula 3]

$$IL(\theta) = \frac{V1 - V2}{2\pi \cdot fsw \cdot L} \cdot (\theta - \delta1) + IL2 \quad (3)$$

FIG. 2 illustrates a current waveform in the case of V1>V2. In the first embodiment, it is assumed that DC voltage V1 and DC voltage V2 (primary-side conversion) are V1=V2 in a steady state. However, in the case of FIG. 2, it is assumed that an input and output voltage fluctuation occurs due to a control error, disturbance, a load fluctuation, a power fluctuation on a power supply side, or the like to become transiently V1>V2.

In the phase period of π<θ<2π, alternating current IL (θ) changes in accordance with equations (1) to (3) in which the polarity is inverted. From equation (3), the following equation (4) holds for current IL3 when θ=π.

[Mathematical Formula 4]

$$IL3 = \frac{V1 - V2}{2\pi \cdot fsw \cdot L} \cdot (\pi - \delta1) + IL2 \quad (4)$$

A relationship of IL3=−IL0 holds between current IL0 (θ=0) and current IL3 (θ=π) because alternating current IL changes periodically. For this reason, the following equation (5) holds for current IL0.

[Mathematical Formula 5]

$$IL0 = -\frac{(V1 - V2) \cdot (\pi - \delta1) - V2(\delta1 - \phi1) + V2\phi1}{4\pi \cdot fsw \cdot L} \quad (5)$$

Transmission power P from first bridge circuit 12 to second bridge circuit 22 is obtained by integrating DC voltage V1 and alternating current IL from DC power supply 10 as a function of phase θ, over one period with phase θ. Consequently, using equations (1) to (5), transmission power P from first bridge circuit 12 to second bridge circuit 22 is expressed by the following equation (6).

[Mathematical Formula 6]

$$\begin{aligned} P &= \frac{1}{2\pi} \int_0^{2\pi} V1(\theta)IL(\theta)d\theta \\ &= \frac{1}{\pi} \int_0^{\pi} V1(\theta)IL(\theta)d\theta \\ &= \frac{V1}{\pi} \int_{\delta1}^{\pi} \left[ \frac{V1 - V2}{2\pi \cdot fsw \cdot L} \cdot (\theta - \delta1) + IL2 \right] d\theta \\ &= \frac{V1V2}{2\pi \cdot fsw \cdot L} \cdot (\phi1 - \frac{\delta1}{2}) - (1 - \frac{\delta1}{\pi}) \end{aligned} \quad (6)$$

As is clear from equation (6), transmission power P is a two-variable function of phase difference ϕ1 and phase difference δ1. At this point, from equations (1) and (5), current IL1 at θ=ϕ1 is expressed by an equation (7).

[Mathematical Formula 7]

$$IL1 = \frac{-V1 \cdot (\pi - \delta1) + V2 \cdot \pi}{4\pi \cdot fsw \cdot L} \quad (7)$$

Furthermore, from equations (2) and (5), current IL2 at $\theta = \delta 1$ is expressed by the following equation (8).

[Mathematical Formula 8]

$$IL2 = \frac{-V1 \cdot (\pi - \delta 1) + V2 \cdot (\pi + 2 \cdot \phi 1 - 2 \cdot \delta 1)}{4\pi \cdot fsw \cdot L} \quad (8)$$

As is clear from equation (7), current IL1 is independent from phase difference $\phi 1$, but depends only on phase difference $\delta 1$.

At this point, in second bridge circuit 22 in which the phase difference is not provided between the switching legs, switching elements Q22, Q23 are turned off (switching elements Q21, Q24 are turned on) at $\theta = \phi 1$, while switching elements Q21, Q24 are turned off (switching elements Q22, Q23 are turned on) at $\theta = (\pi + \phi 1)$. Consequently, it is understood that the turn-off currents of switching elements Q21 to Q24, which affect the switching loss, is independent from phase difference $\phi 1$ because of alternating current $IL\theta = \phi 1$ or $\theta = \pi + \phi 1$, namely, current IL1 or –IL1.

On the other hand, snubber capacitor Cs is connected in parallel to each of switching elements Q11 to Q14 and Q21 to Q24. Consequently, in the period of dead time TD after each switching element is turned off, the soft switching is achieved when snubber capacitor Cs is charged and discharged and the charging and discharging time of snubber capacitor Cs becomes shorter than dead time TD.

At this point, assuming that a limit value of current necessary for making charging and discharging of snubber capacitor Cs shorter than dead time TD is Izvs, current Izvs can be obtained from a relationship between magnetic energy stored in inductance element Lt and electrostatic energy stored in snubber capacitor Cs. Specifically, while the magnetic energy stored in inductance element Lt is $(L \cdot Izvs^2/2)$, the electrostatic energy stored in snubber capacitor Cs is $Cs \cdot V1^2/2$ in first bridge circuit 12 in which snubber capacitor Cs is charged at V1, and $Cs \cdot V2^2/2$ in second bridge circuit 22 in which snubber capacitor Cs is charged at V2.

Consequently, current Izvs can be obtained by the following equation (9) when

DC voltage Vx (Vx=V1 in first bridge circuit 12, and Vx=V2 in second bridge circuit 22) is used. In equation (9), current Izvs enabling the soft switching can be calculated from circuit constants L and Cs and DC voltages V1, V2 (detection values). Current Izvs indicates a "zero volt switching current value".

[Mathematical Formula 9]

$$Izvs = 2 \cdot Vx \cdot \sqrt{\frac{Cs}{L}} \quad (9)$$

Alternatively, because current Izvs is a current charging snubber capacitor Cs during dead time TD, current Izvs can also be obtained by the following equation (10) using DC voltage Vx similar to equation (9).

[Mathematical Formula 10]

$$Izvs = \frac{1}{Cs} \int_0^{TD} Vx \, dt = \frac{Vx}{Cs} \cdot TD \quad (10)$$

Also in equation (10), current Izvs can be calculated from predetermined dead time TD, circuit constant Cs, and DC voltages V1, V2 (detection values). Consequently, current Izvs enabling the soft switching can be determined using equation (9) or equation (10).

Alternatively, current Izvs can also be set using the maximum value among the values calculated by equations (9) and (10). In this way, the zero voltage switching can be more reliably applied.

At this point, as described above, the turn-off current in second bridge circuit 22 in which the phase difference is not provided between the switching legs is IL1 or –IL1 expressed by equation (7). Consequently, in the first embodiment, phase difference $\delta 1$ achieving the soft switching in second bridge circuit 22 can be obtained by substituting current Izvs obtained as Vx=V2 in equations (9) and (10) into IL1 in equation (7) (IL1=Izvs). Specifically, the following equation (11) can be obtained by solving equation (7) in which LL1=Izvs is substituted with respect to phase difference $\delta 1$. Phase difference $\delta 1$, namely, equation (11) obtaining a zero voltage period length in the first embodiment corresponds to an example of a "first arithmetic expression".

[Mathematical Formula 11]

$$\delta 1 = \pi + \frac{4\pi \cdot fsw \cdot L}{V1} \cdot \left( Izvs - \frac{V2 \cdot \pi}{4\pi \cdot fsw \cdot L} \right) \quad (11)$$

In accordance with equation (11), phase difference $\delta 1$ can be calculated as a value achieving the soft switching in second bridge circuit 22 using the detection values of DC voltages V1, V2 and the calculated value of current Izvs.

As a result, because phase difference $\delta 1$ is set to a constant calculated by equation (11) in order to achieve the soft switching in equation (6), transmission power P is controlled with phase difference $\phi 1$ as a variable. That is, phase difference $\phi 1$ corresponding to transmission power P can be obtained by substituting phase difference $\delta 1$ and DC voltages V1, V2 obtained by equation (11) into an equation (12) below obtained by solving equation (6) for phase difference $\phi 1$. An equation (12) obtaining phase difference $\phi 1$ corresponds to an example of a "second arithmetic expression".

[Mathematical Formula 12]

$$\phi 1 = \frac{2\pi \cdot fsw \cdot P}{V1 V2} \cdot \left( 1 - \frac{\delta 1}{\pi} \right) + \frac{\delta 1}{2} \quad (12)$$

As described above, according to the power conversion device of the first embodiment, the phase difference is not provided between the switching legs in second bridge circuit 22 while phase difference $\delta 1$ is provided between the switching legs only by first bridge circuit 12, so that the power transmission is executed in a mode in which the zero voltage period is provided only for AC voltage VT1 while the zero voltage period is not provided for AC voltage VT2.

As described above, while phase difference $\delta 1$ controlling the zero voltage period is set so that the soft switching is executed in second bridge circuit 22, phase difference $\phi 1$ between first bridge circuit 12 and second bridge circuit 22 can be set so as to control transmission power P under the above phase difference 61.

As a result, unlike PTL 1, phase difference $\delta 1$ and phase difference $\phi 1$ can be set without interfering with each other, so that transmission power P can be easily controlled. At this point, because the soft switching is executed in second bridge circuit 22 by setting phase difference δ1, the power loss generated in switching elements Q21 to Q24 can be suppressed to increase the efficiency of power conversion device 100. The operation of power conversion device 100 in the case where the zero voltage period is provided on the side of first bridge circuit 12 in the "first operation mode" is described in the first embodiment.

Second Embodiment

The control in which the zero voltage period is provided in AC voltage VT1 output from first bridge circuit 12 by providing phase difference δ1 between the switching legs in first bridge circuit 12 is described in the first embodiment. In a second embodiment, contrary to the first embodiment, the control in which the zero voltage period is provided in AC voltage VT2 from second bridge circuit 22 will be described. Also in the second and subsequent embodiments, the circuit configuration of power conversion device 100 is the same as that of the first embodiment (FIG. 1).

Figure 3:
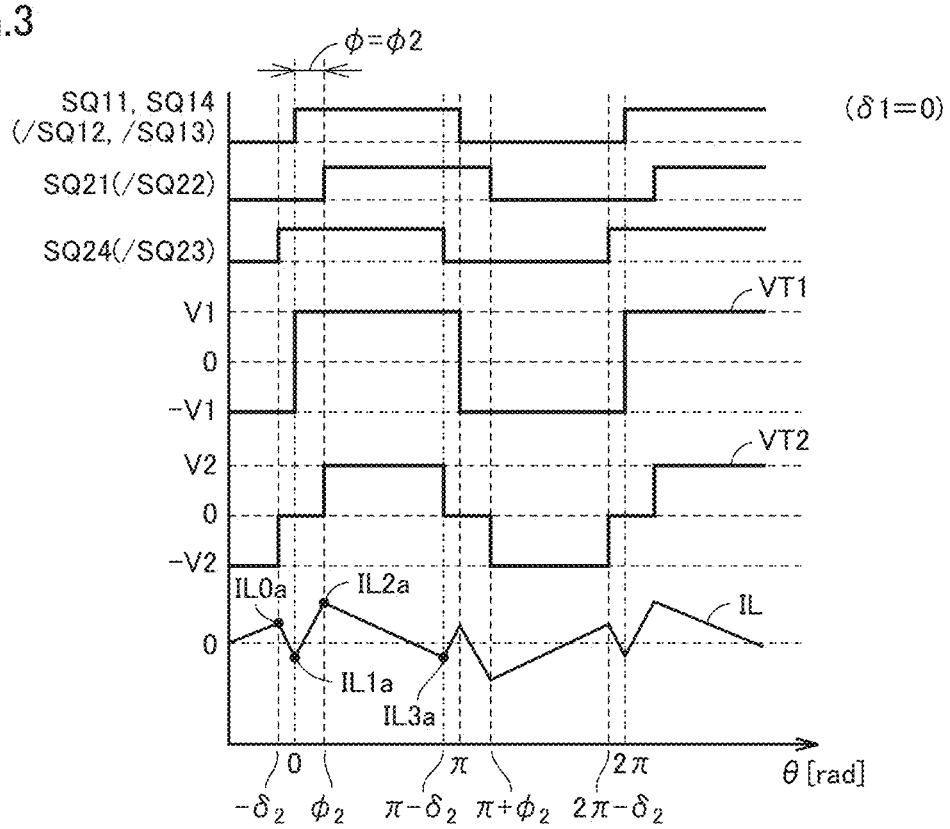
FIG. 3 is a waveform chart illustrating an example of on and off control of a switching element in a power conversion device according to the second embodiment.

FIG. 3 is a waveform chart illustrating an example of the on and off control of switching elements Q11 to Q14, Q21 to Q24 in the power conversion device of the second embodiment. The horizontal axis in FIG. 3 is similar to FIG. 2, gate signals SQ11 to SQ14, SQ21 to SQ24, AC voltages VT1, VT2, and alternating current IL are illustrated in FIG. 3 similarly to FIG. 2. Although not illustrated in FIG. 3, a dead time similar to that in FIG. 2 is provided.

Referring to FIG. 3, in the second embodiment, in first bridge circuit 12, the phase difference is not provided between gate signal SQ11 (/SQ12) of switching elements Q11, Q12 and gate signal SQ14 (/SQ13) of switching elements Q13, Q14. That is, the phase at which the on and off are switched between the positive-side switching element and the negative-side switching element is the same between the switching legs, the on and off of switching elements Q11 and Q14 are switched at the same timing, and the on and off of switching elements Q12 and Q13 are switched at the same timing. For this reason, AC voltage VT1 output from first bridge circuit 12 to first AC terminal 13 has amplitude V1 and does not have the zero voltage period.

Also in the second embodiment, phase difference ϕ controlling the power transmission is provided between the switching phase of first bridge circuit 12 and the switching phase of second bridge circuit 22. In the second embodiment, with respect to gate signal SQ11 of switching element Q11, a phase difference ϕ2 is provided to gate signal SQ21 of switching element Q21 (ϕ=ϕ2). As a result, phase difference ϕ2 is generated between AC voltage VT1 and AC voltage VT2. In the second embodiment, phase difference ϕ2 corresponds to an example of the "first phase difference".

In the second embodiment, in second bridge circuit 22, the phase difference is provided between gate signal SQ21 (/SQ22) of switching elements Q21 and Q22 and gate signal SQ24 (/SQ23) of switching elements Q23 and Q24. Specifically, similarly to the first embodiment, a phase difference −δ2 is provided in gate signal SQ24 (/SQ23) of switching element Q24 with reference to gate signal SQ11 of switching element Q11, so that a phase difference (ϕ2+δ2) is provided between gate signal SQ21 (/SQ22) and gate signal SQ24 (/SQ23) between the switching legs. That is, in the second embodiment, phase difference (ϕ2+δ2) corresponds to an example of the "second phase difference". As a result, AC voltage VT2 output from second bridge circuit 22 to second AC terminal 23 has amplitude V2 and has the zero voltage period corresponding to phase difference (ϕ2+δ2).

Also in the second embodiment, alternating current IL (θ) at phase θ is obtained in each phase. As illustrated in FIG. 3, IL (−δ2)=IL0a, IL (0)=IL1a, IL (ϕ2)=IL2a, IL (π−δ2)=IL3a.

In the phase period of −δ2<θ<0, because of VT1=−V1 and VT2=0, alternating current IL (θ) is expressed by the following equation (13).

[Mathematical Formula 13]

$$IL(\theta) = -\frac{V1}{2\pi \cdot fsw \cdot L} \cdot (\theta + \delta 2) + IL0a \qquad (13)$$

Then, in the phase period of 0<θ<ϕ2, because of VT1=V1 and VT2=0, alternating current IL(θ) is expressed by the following equation (14).

[Mathematical Formula 14]

$$IL(\theta) = \frac{V1}{2\pi \cdot fsw \cdot L} \cdot \theta + IL1a \qquad (14)$$

Similarly, in the phase period of ϕ2<θ<π−δ2, because of VT1=V1 and VT2=V2, alternating current IL (θ) is expressed by the following equation (15). FIG. 3 illustrates a current waveform in the case of V2>V1. In the transient state in which the input and output voltage fluctuation occurs as described above, it is assumed that V2>V1 contrary to the first embodiment.

[Mathematical Formula 15]

$$IL(\theta) = \frac{V1 - V2}{2\pi \cdot fsw \cdot L} \cdot (\theta - \phi 2) + IL2a \qquad (15)$$

From equation (15), the following equation (16) holds for current IL3a in the case of θ=π−δ2.

[Mathematical Formula 16]

$$IL3a = \frac{V1 - V2}{2\pi \cdot fsw \cdot L} \cdot (\pi - \delta 2 - \phi 2) + IL2a \qquad (16)$$

Since alternating current IL changes periodically, a relationship of IL3a=−IL0a holds between current IL0a (θ=−δ2) and current IL3a (θ=π−δ2). For this reason, the following equation (17) holds for current IL0a.

[Mathematical Formula 17]

$$IL0a = -\frac{V1\delta 2 - V1\phi 2 - (V1 - V2) \cdot (\pi - \delta 2 - \phi 2)}{4\pi \cdot fsw \cdot L} \qquad (17)$$

In the second embodiment, transmission power P is obtained by integrating DC voltage V2 from load 20 and alternating current IL as the function of phase θ, over one period with phase θ. Consequently, using equations (13) to (17), transmission power P from first bridge circuit 12 to second bridge circuit 22 is expressed by the following equation (18).

[Mathematical Formula 18]

$$P = \frac{1}{2\pi}\int_{-\delta 2}^{2\pi-\delta 2} V2(\theta)IL(\theta)d\theta = \frac{1}{\pi}\int_{-\delta 2}^{\pi-\delta 2} V2(\theta)IL(\theta)d\theta \qquad (18)$$

$$= \frac{V2}{\pi}\int_{\delta 1}^{\pi}\left[\frac{V1-V2}{2\pi \cdot fsw \cdot L} \cdot (\theta - \phi 2) + IL2a\right]d\theta$$

$$= \frac{V1V2}{4\pi \cdot fsw \cdot L} \cdot \left(1 - \frac{\phi 2 + \delta 2}{\pi}\right)(\phi 2 - \delta 2)$$

As is clear from equation (18), transmission power P is a two-variable function of phase difference $\phi 2$ and phase difference $\delta 2$. At this point, from equations (13) and (17), current IL1a at $\theta=0$ is expressed by an equation (19).

[Mathematical Formula 19]

$$IL1a = \frac{-V1 \cdot \pi + V2 \cdot (\pi - \delta 2 - \phi 2)}{4\pi \cdot fsw \cdot L} \qquad (19)$$

Furthermore, from equations (14) and (17), current IL2a at $\theta=\phi 2$ is expressed by the following equation (20).

[Mathematical Formula 20]

$$IL2a = \frac{-V1 \cdot (\pi - 2 \cdot \phi 2) + V2 \cdot (\pi - \phi 2 - \delta 2)}{4\pi \cdot fsw \cdot L} \qquad (20)$$

At this point, in first bridge circuit 12 in which the phase difference is not provided between the switching legs, switching elements Q12, Q13 are turned off (switching elements Q11, Q14 are turned on) at $\theta=0$, and switching elements Q11, Q14 are turned off (switching elements Q12, Q13 are turned on) at $\theta=\pi$. Consequently, the turn-off currents of switching elements Q11 to Q14 that affect the switching loss become alternating current IL at $\theta=0$ or $\theta=\pi$, namely, current IL1a or −IL1a.

The power loss generated in switching elements Q11 to Q14 can be suppressed by setting current IL1a to current Izvs executing the soft switching illustrated in equations (9), (10). In the second embodiment, in equations (9), (10), current Izvs can be obtained with Vx=V1.

Furthermore, by solving equation (19) in which IL1a=Izvs is substituted for $\delta 2$, the following equation (21a) is obtained. Furthermore, when equation (21a) is modified, an equation (21b) indicating zero voltage period ($\delta 2+\phi 2$) required in the second embodiment is obtained. Equation (21b) corresponds to an example of the "first arithmetic expression".

[Mathematical Formula 21]

$$\delta 2 = \pi - \frac{4\pi \cdot fsw \cdot L}{V2} \cdot \left(Izvs + \frac{V1 \cdot \pi}{4\pi \cdot fsw \cdot L}\right) - \phi 2 \qquad (21a)$$

$$\delta 2 + \phi 2 = \pi - \frac{4\pi \cdot fsw \cdot L}{V2} \cdot \left(Izvs + \frac{V1 \cdot \pi}{4\pi \cdot fsw \cdot L}\right) \qquad (21b)$$

A right side of equation (21b) can be calculated by substituting DC voltages V1, V2 (detection values) and current Izvs from equations (9), (10) as the zero voltage period length achieving the soft switching in first bridge circuit 12. In equation (21b), the zero voltage period length can be calculated using switching frequency fsw, inductance value L of inductance element Lt, current Izvs, and DC voltages V1, V2, which are similar to the right side of equation (11) obtaining phase difference $\delta 1$ in the first embodiment.

On the other hand, the following equation (22) is obtained by deforming equation (18) so as to be solved by phase difference $\phi 2$.

[Mathematical Formula 22]

$$[\pi - (\phi 2 + \delta 2)] \cdot (\phi 2 - \delta 2) = \frac{4\pi^2 \cdot fsw \cdot L \cdot P}{V1V2} \qquad (22)$$

At this point, equation (23) can be obtained by substituting equation (21a) into equation (22).

[Mathematical Formula 23]

$$\phi 2 = \qquad (23)$$

$$\frac{1}{2}\left[\frac{P}{V1} \cdot \pi \cdot \left(Izvs + \frac{V1 \cdot \pi}{4\pi \cdot fsw \cdot L}\right)^{-1} + \pi - \frac{4\pi \cdot fsw \cdot L}{V2} \cdot \left(Izvs + \frac{V1 \cdot \pi}{4\pi \cdot fsw \cdot L}\right)\right]$$

Using equation (23), phase difference $\phi 2$ controlling transmission power P can be obtained by substituting DC voltages V1, V2 (detection values) and current Izvs obtained from equations (9), (10). Equation (23) obtaining phase difference $\phi 2$ corresponds to an example of a "third arithmetic expression". Furthermore, phase difference $\delta 2$ can be obtained by subtracting phase difference $\phi 2$ obtained by equation (23) from the value (zero voltage period length) obtained on the right side of equation (21b).

As described above, in the power conversion device of the second embodiment, the phase difference is not provided between the switching legs in first bridge circuit 12 while phase difference ($\phi 2+\delta 2$) is provided between the switching legs only by second bridge circuit 22, so that the power transmission is executed in a mode in which the zero voltage period is provided only for AC voltage VT2 and the zero voltage period is not provided for AC voltage VT1.

As described above, while phase difference ($\phi 2+\delta 2$) corresponding to the zero voltage period length is set to execute the soft switching in first bridge circuit 12, phase difference $\phi 2$ between first bridge circuit 12 and second bridge circuit 22 can be set to control transmission power P under the zero voltage period.

As a result, unlike PTL 1, phase difference $\delta 2$ and phase difference $\phi 2$ can be set without interfering with each other, so that transmission power P can be easily controlled. At this point, because the soft switching is executed in first bridge circuit 12 by setting phase difference $\delta 2$, the power loss generated in switching elements Q11 to Q 14 can be suppressed to increase the efficiency of power conversion device 100. The operation of power conversion device 100 in the case where the zero voltage period is provided on the side of second bridge circuit 22 in the "first operation mode" is described in the second embodiment.

Third Embodiment

The control in which the zero voltage period is provided only on one of the side of first bridge circuit 12 and the side of second bridge circuit 22 is described in the first and second embodiments. In a third embodiment, control selecting which first bridge circuit 12 and second bridge circuit 22 is provided with the zero voltage period will be described.

Figure 4A:
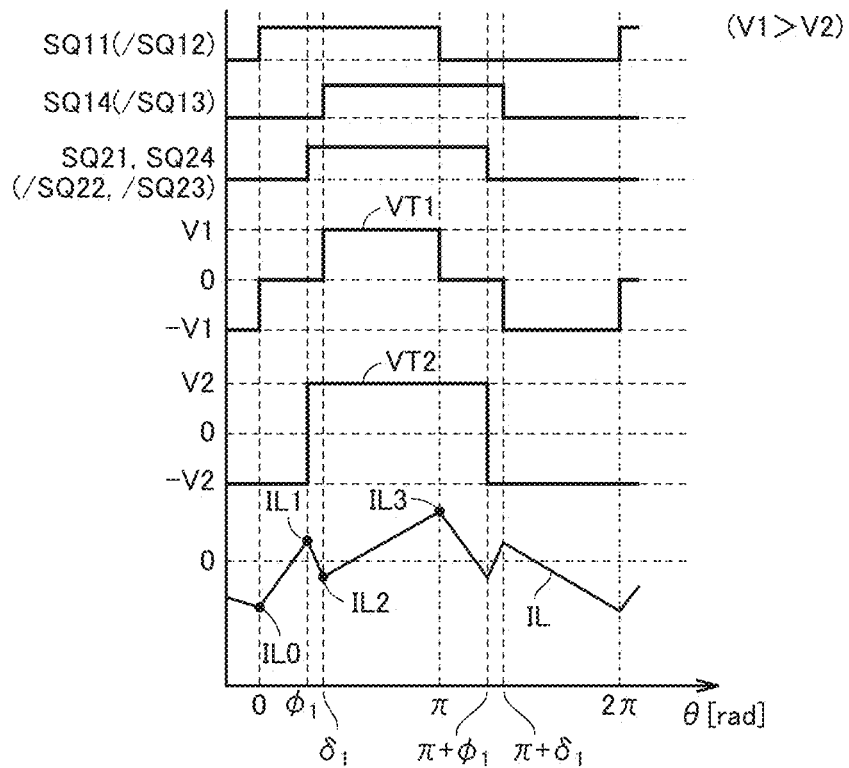
FIG. 4A is a first waveform chart illustrating an example of the on and off control of the switching element when a zero voltage period is provided on a first bridge circuit side (first embodiment).
Figure 4B:
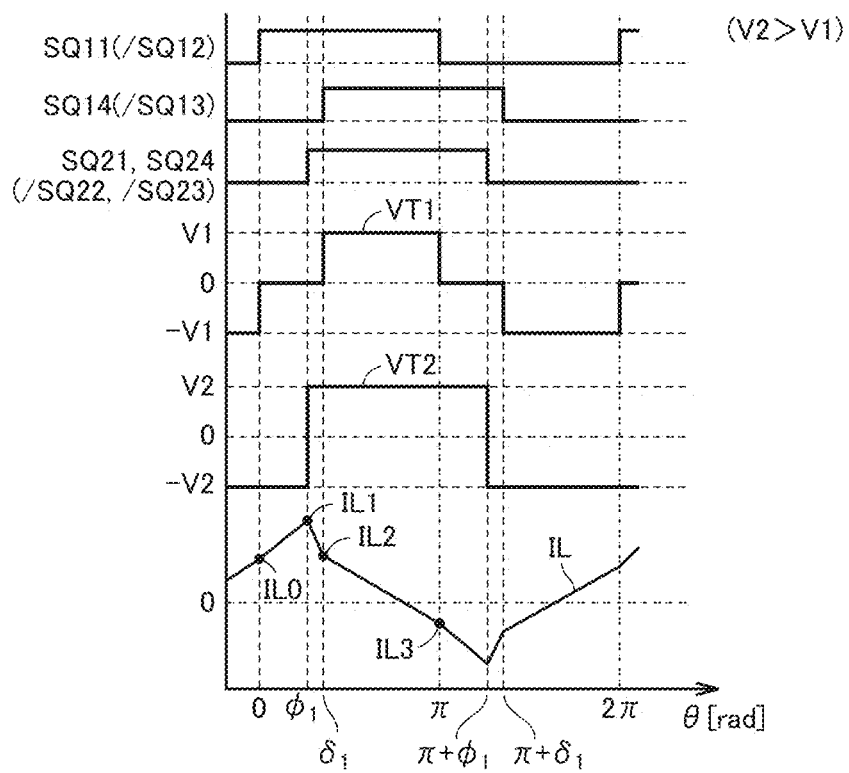
FIG. 4B is a second waveform chart illustrating an example of the on and off control of the switching element when the zero voltage period is provided on the first bridge circuit side (first embodiment).

FIGS. 4A and 4B are waveform charts illustrating the on and off control of the switching element of the first embodiment when the zero voltage period is provided on the side of the first bridge circuit (AC voltage VT1).

FIG. 4A illustrates the waveform chart in the case of V1>V2, and each waveform in FIG. 4A is the same as that in FIG. 2. On the other hand, FIG. 4B illustrates the waveform chart with the same notation as FIG. 4A when the zero voltage period is provided on the side of the first bridge circuit (AC voltage VT1) under V1<V2 that is opposite to FIG. 2.

In FIG. 4A, similarly to FIG. 2, alternating current IL increases because of (V1−V2)>0 in the phase section of $\delta 1 < \theta < \pi$. On the other hand, in the waveform chart of FIG. 4B, alternating current IL decreases because of (V1−V2)<0 in the phase section of $\delta 1 < \theta < \pi$.

In FIG. 4B, as a result that the increase and decrease of alternating current IL are different from those in FIG. 4A (FIG. 2), current IL0 ($\theta=0$), current IL1 ($\theta=\phi 1$), current IL2 ($\theta=\delta 1$), and current IL3 ($\theta=\pi$) are different from the values in FIG. 4A described in the first embodiment.

In particular, in FIG. 4B, regarding current IL1 at the turn-off timing ($\theta=\phi 1, \pi+\phi 1$) of switching elements Q21 to Q24 of second bridge circuit 22 in which the phase difference is not provided between the switching legs, it is understood that polarity is the same but an absolute value is larger than that in FIG. 4A. As a result, there is a concern about the increase in power loss during the turn-off.

In FIG. 4B, in first bridge circuit 12 in which the phase difference is provided between the switching legs, the polarities of current IL3 at the turn-off timing ($\theta=\pi$) of switching element Q11 and current IL0 at the turn-off timing ($\theta=0$) of switching element Q12 are opposite to those in FIG. 4A. As a result, switching elements Q11, Q12 are turned off while the current flows in the anti-parallel diode, and what is called a recovery loss occurs while snubber capacitor Cs cannot be charged and discharged, so that the energy stored in snubber capacitor Cs is consumed by the switching element. As a result, in FIG. 4B, compared to FIG. 4A, there is a concern about the increase in power loss due to the on and off of the switching element in both first bridge circuit 12 and second bridge circuit 22.

Consequently, when V1>V2 holds between DC voltages V1, V2, preferably the zero voltage period is provided in AC voltage VT1 by providing the phase difference between the switching legs in first bridge circuit 12 as described in the first embodiment.

Figure 5A:
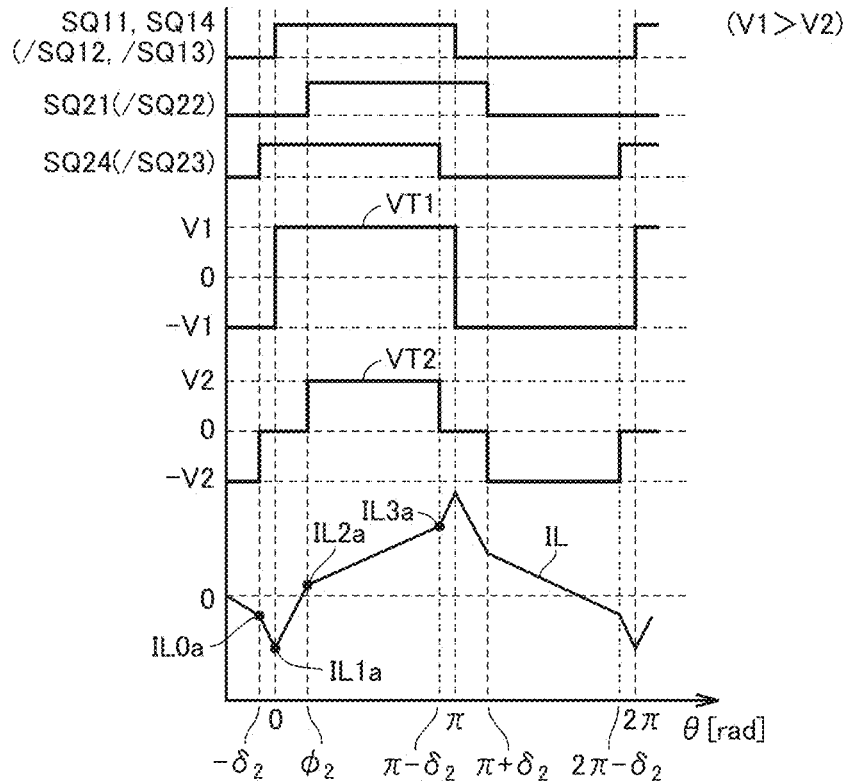
FIG. 5A is a first waveform chart illustrating an example of the on and off control of the switching element when the zero voltage period is provided on a second bridge circuit side (second embodiment).
Figure 5B:
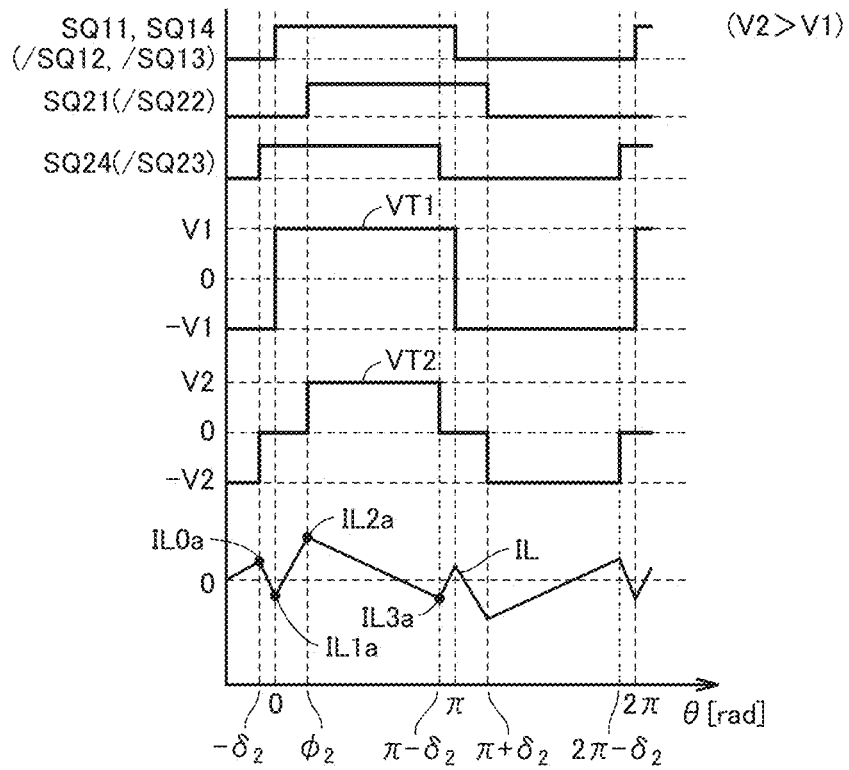
FIG. 5B is a second waveform chart illustrating an example of the on and off control of the switching element when the zero voltage period is provided on the second bridge circuit side (second embodiment).

FIGS. 5A and 5B are waveform charts illustrating the on and off control of the switching element of the second embodiment when the zero voltage period is provided on the side of the second bridge circuit (AC voltage VT2).

FIG. 5A illustrates the waveform chart in the case of V1>V2, and FIG. 5B illustrates the waveform chart in the case of V2>V1. Each waveform in FIG. 5B is the same as that in FIG. 3. On the other hand, in FIG. 5A, the waveform chart is illustrated by the same notation as in FIG. 5B when the zero voltage period is provided on the side of the second bridge circuit (AC voltage VT2) under V1>V2 contrary to FIG. 3.

In FIG. 5B, similarly to FIG. 3, alternating current IL decreases because of (V1−V2)<0 in the phase section of $\phi 2 < \theta < \pi - \delta 2$. On the other hand, in the waveform chart of FIG. 5A, alternating current IL increases because of (V1−V2)>0 in the phase section of $\phi 2 < \theta < \pi - \delta 2$.

As a result, in FIG. 5A, the increase and decrease of alternating current IL are different from those in FIG. 5B (FIG. 3). Consequently, current IL0a ($\theta=-\delta 2$), current IL1a ($\theta=0$), current IL2a ($\theta=\phi 2$), and current IL3a ($\theta=\pi-\delta 2$) are different from the values in FIG. 5B of the second embodiment.

In particular, in FIG. 5A, regarding current IL1a at the turn-off timing ($\theta=0, \pi$) of switching elements Q11 to Q14 of first bridge circuit 12 in which the phase difference is not provided between the switching legs, it is understood that the polarity is the same and the absolute value is larger than that in FIG. 5B. As a result, there is a concern about the increase in power loss during the turn-off.

In FIG. 5A, in second bridge circuit 22 in which the phase difference is provided between the switching legs, the polarity of current I2a at the turn-off timing ($\theta=\phi 2$) of switching element Q21 and the polarity of current −IL0a at the turn-off timing ($\theta=\pi+\delta 2$) of switching element Q22 are opposite to those in FIG. 5B. As a result, switching elements Q21, Q22 are turned off while current flows through the anti-parallel diode. Thus, similarly to switching elements Q11, Q12 in FIG. 4B, the power loss in switching elements Q21, Q22 increases. As a result, in FIG. 5A, as compared with FIG. 5B, there is a concern about the increase in power loss due to the on and off of the switching element in both first bridge circuit 12 and second bridge circuit 22.

Consequently, when V2>V1 holds between DC voltages V1, V2, preferably the zero voltage period is provided in AC voltage VT2 by providing the phase difference between the switching legs in second bridge circuit 22 as described in the second embodiment.

From these findings, in the power conversion device of the third embodiment, first bridge circuit 12 and second bridge circuit 22 are controlled based on the comparison between DC voltages V1 and V2.

Figure 6:
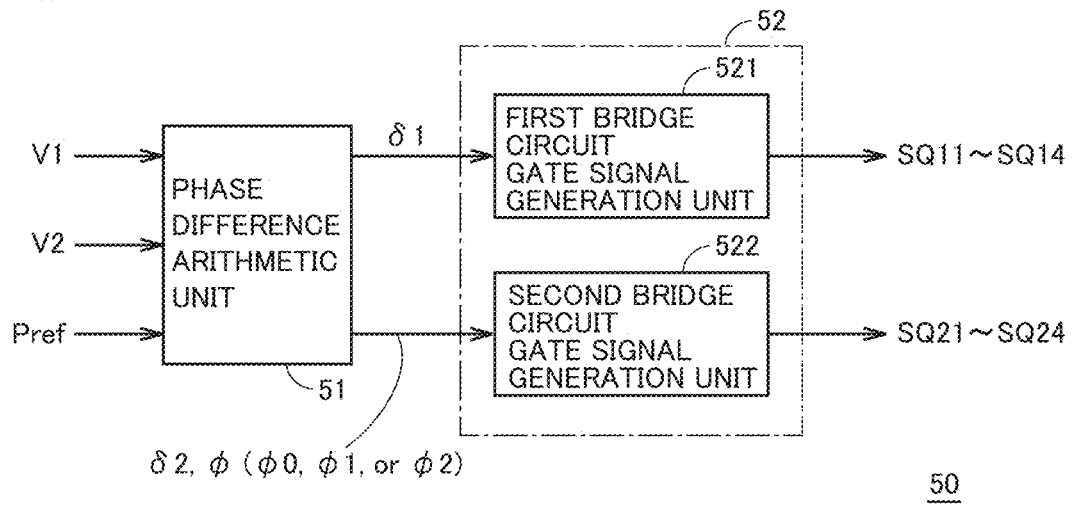
FIG. 6 is a block diagram illustrating a configuration example of a control circuit of a power conversion device according to a third embodiment.

FIG. 6 is a block diagram illustrating a configuration example of the control circuit of the power conversion device of the third embodiment.

Referring to FIG. 6, in the third embodiment, control circuit 50 includes a phase difference arithmetic unit 51 and a gate signal generation unit 52. A transmission power command value Pref that is a target value of transmission power P and detection values of DC voltages V1 and V2 by a sensor (not illustrated) are input to phase difference arithmetic unit 51. Gate signal generation unit 52 includes a first bridge circuit signal generation unit 521 and a second bridge circuit signal generation unit 522. First bridge circuit signal generation unit 521 generates gate signals SQ11 to SQ14 to first bridge circuit 12. Second bridge circuit signal generation unit 522 generates gate signals SQ21 to SQ24 to second bridge circuit 22.

Figure 7:
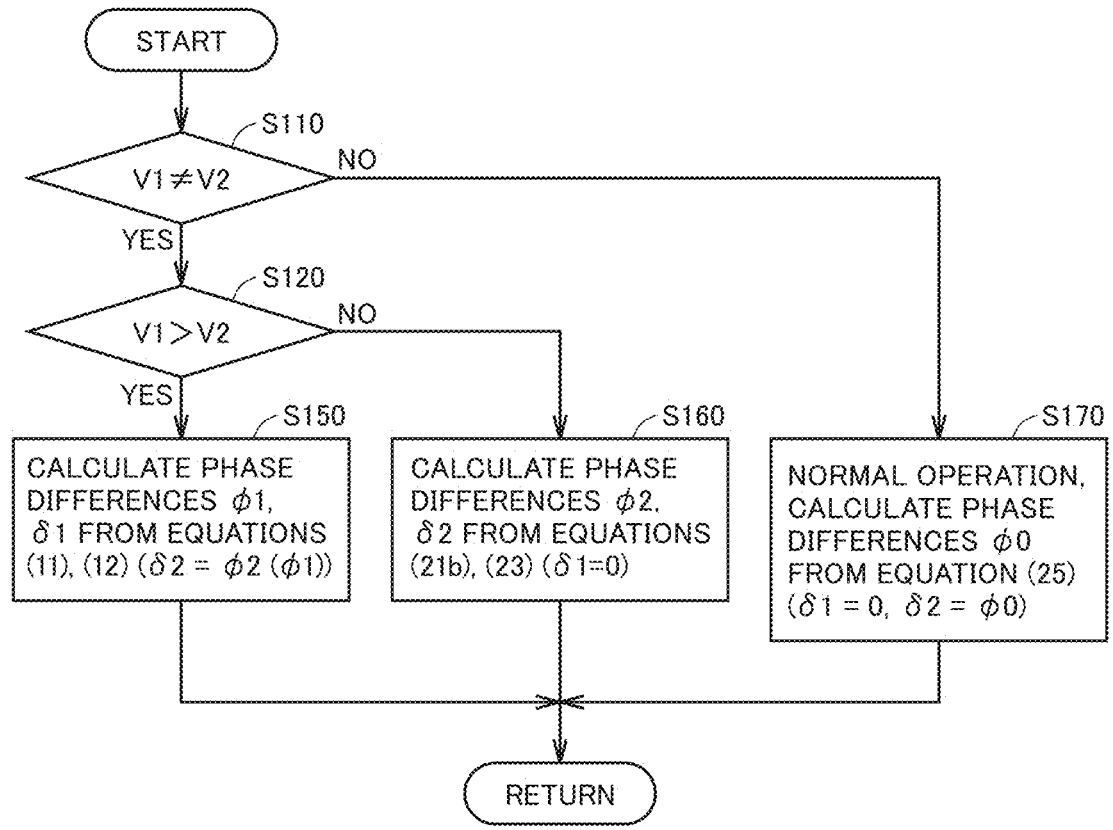
FIG. 7 is a flowchart illustrating control processing by a phase difference arithmetic unit in FIG. 6.

FIG. 7 is a flowchart illustrating control processing executed by phase difference arithmetic unit 51.

The control processing illustrated in the flowchart of FIG. 7 can be executed by software and/or hardware by a digital electronic circuit and/or an analog electronic circuit constituting control circuit 50.

Referring to FIG. 7, in step (hereinafter, simply referred to as "S") 110, phase difference arithmetic unit 51 determines whether DC voltages V1 and V2 are matched with each other by comparing the detection values of DC voltages V1 and V2. In the case of V1≠V2 (YES in S110), the levels of the detection values of DC voltages V1 and V2 are further determined in S120. As described above, a primary-side converted value of the detection value of DC voltage V2 is used in the control processing of each step.

In the case of V1>V2 (YES in S120), phase difference arithmetic unit 51 calculates phase differences φ1 and δ1 in S150. On the other hand, the zero voltage period is not provided on the side of second bridge circuit 22, so that phase difference δ2=φ2 (in this case, φ2=φ1 can be set) is set. In S150, the detection values of DC voltages V1, V2, current Izvs (equations (9), (10)), and P=Pref are substituted into equations (11), (12) in the first embodiment, whereby phase differences φ1 and δ1 can be calculated.

Thus, in the case of V1>V2, similarly to the first embodiment, phase difference δ1 is provided between the switching legs of first bridge circuit 12, and the zero voltage period (δ1) is provided in AC voltage VT1. Consequently, in the case of V1>V2, power conversion device 100 operates in accordance with the waveform of FIG. 4A instead of the waveform of FIG. 4B, so that the power loss can be suppressed in both first bridge circuit 12 and second bridge circuit 22.

On the other hand, in the case of V2>V1 (NO in S120), phase difference arithmetic unit 51 calculates phase differences φ2 and φ2 in S160, and sets phase difference δ1 to 0. In S160, phase differences φ2 and δ2 can be calculated by substituting the detection values of DC voltages V1, V2, current Izvs (equations (9), (10)), and P=Pref into equations (21b), (23) in the second embodiment.

Thus, in the case of V2>V1, similarly to the second embodiment, phase difference (φ2+δ2) is provided between the switching legs of second bridge circuit 22, and zero voltage period (φ2+δ2) is provided in AC voltage VT2. Consequently, in the case of V2>V1, power conversion device 100 operates in accordance with the waveform of FIG. 5B instead of the waveform of FIG. 5A, so that the power loss can be suppressed in both first bridge circuit 12 and second bridge circuit 22.

On the other hand, in the case of V1=V2 (NO in S110), phase difference arithmetic unit 51 executes the normal operation in which the zero voltage period is not provided in both first bridge circuit 12 and second bridge circuit 22. The normal operation corresponds to a "second operation mode".

In the normal operation, phase differences δ1=0, δ2=φ2 are set in first bridge circuit 12 and second bridge circuit 22. Consequently, in first bridge circuit 12, similarly to FIG. 3, the on and off of switching elements Q11 and Q14 are switched at the same timing, and the on and off of switching elements Q12 and Q13 are switched at the same timing. For this reason, similarly to FIG. 3, AC voltage VT1 becomes the waveform having amplitude V1 and having no zero voltage period.

Similarly, in second bridge circuit 22, similarly to FIG. 2, the on and off of switching elements Q21 and Q24 are switched at the same timing, and the on and off of switching elements Q22 and Q23 are switched at the same timing. For this reason, similarly to FIG. 2, the AC voltage VT2 becomes the waveform having amplitude V2 and having no zero voltage period.

In the normal operation, phase difference φ0 is provided to gate signal SQ11 of switching element Q11 with respect to gate signal SQ21 of switching element Q21 (φ=φ0). As a result, phase difference φ0 is generated between AC voltage VT1 and AC voltage VT2. In the normal operation, phase difference φ0 corresponds to an example of the "first phase difference". Transmission power P in the normal operation is controlled by the following equation (24).

[Mathematical Formula 24]

$$P = \frac{V1V2}{2\pi \cdot fsw \cdot L} \cdot \phi 0 \cdot \left(1 - \frac{\phi 0}{\pi}\right) \quad (24)$$

Consequently, in S170, phase difference φ0 for the purpose of the transmission power control can be calculated by substituting P=Pref and the detection values of DC voltages V1, V2 into the following equation (25) obtained by solving equation (24) by phase difference φ0. Phase difference φ0 corresponds to the "first phase difference" in the normal operation (second operation mode).

[Mathematical Formula 25]

$$\phi 0 = \frac{\pi}{2} - \sqrt{\left(\frac{\pi}{2}\right)^2 - \frac{2\pi^2 \cdot fsw \cdot L \cdot P}{V1V2}} \quad (25)$$

As a result, phase difference arithmetic unit 51 can calculate phase difference φ(phase difference φ0, φ1, or φ2) and phase differences δ1, δ2 through S150 to S170 for the purpose of the transmission power control.

Referring again to FIG. 6, phase difference arithmetic unit 51 sends phase difference δ1 to first bridge circuit signal generation unit 521, and sends phase difference (φ0, φ1, or φ2) and phase difference δ2 to second bridge circuit signal generation unit 522 for the purpose of the power transmission control.

First bridge circuit signal generation unit 521 generates gate signal SQ11 (/SQ12) in accordance with the reference phase, and generates gate signal SQ14 (/SQ13) so as to have phase difference δ1 with respect to gate signal SQ11 (/SQ12).

Second bridge circuit signal generation unit 522 generates gate signal SQ21 (/SQ22) so as to have phase difference φ(φ0, φ1, or φ2) with respect to gate signal SQ11 (/SQ12) of the reference phase. Furthermore, second bridge circuit signal generation unit 522 generates gate signal SQ24 (/SQ23) so as to have phase difference δ2 with respect to gate signal SQ11 (/SQ12) of the reference phase.

As a result, gate signals SQ11 to SQ14, SQ21 to SQ24 can be generated such that phase difference φ (φ0, φ1, or φ2) is provided between AC voltages VT1 and VT2 for the purpose of the transmission power control, and such that the zero voltage period is provided in one of AC voltages VT1 and VT2 in the case of phase difference δ1≠0 or δ2≠φ.

As described above, according to the power conversion device of the third embodiment, by appropriately switching the setting of the zero voltage period to AC voltages VT1, VT2 in accordance with the states of DC voltages V1, V2, the power loss in switching elements Q11 to Q14 and Q21 to Q24 is reduced, so that the efficiency of power conversion device 100 can be increased.

Fourth Embodiment

In the first to third embodiments, the power loss in first bridge circuit 12 and second bridge circuit 22 is provided by providing the zero voltage period, whereby the efficiency of power conversion device 100 is improved. On the other hand, because the zero voltage period is set longer than phase differences φ1, φ2 for the power transmission control, there is a concern that a power factor decreases in the power transmission. Consequently, strictly speaking, it is necessary to consider a balance between the disadvantage due to the decrease in the power factor and the merit of the reduction of the power loss in first bridge circuit 12 and second bridge circuit 22.

Figure 8:
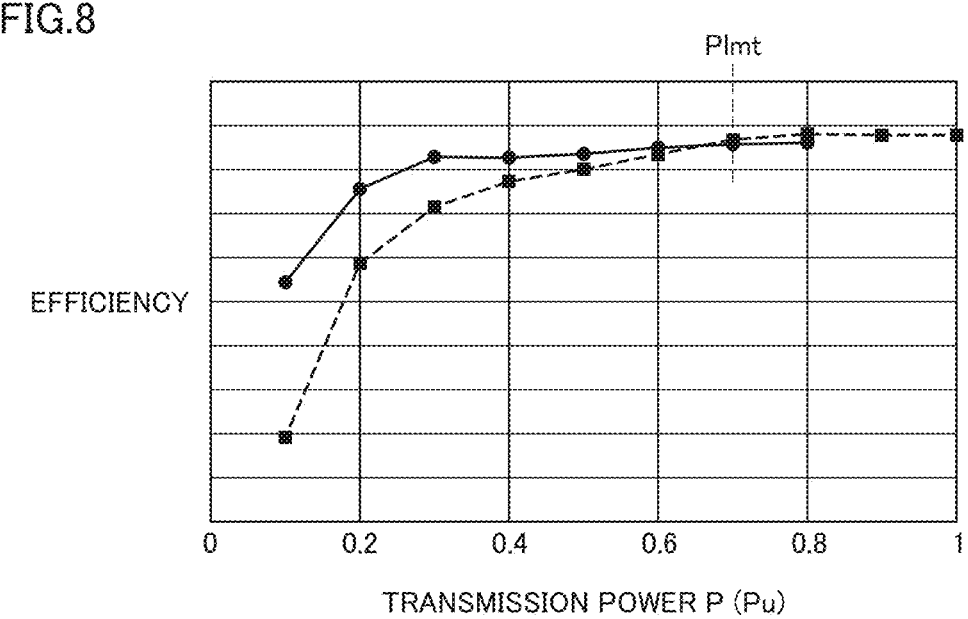
FIG. 8 is a first graph illustrating a simulation result of power transmission efficiency with respect to a change in transmission power in the power conversion device of the embodiment.
Figure 9:
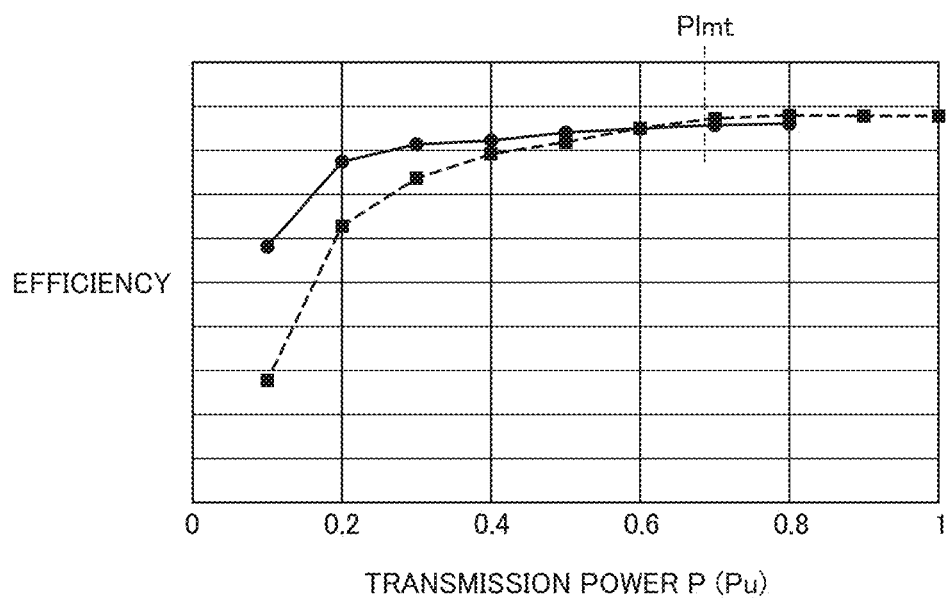
FIG. 9 is a second graph illustrating a simulation result of the power transmission efficiency with respect to the change in transmission power in the power conversion device of the embodiment.

FIGS. 8 and 9 illustrate simulation results of the power transmission under a condition that the transmission power is changed in power conversion device 100.

In FIGS. 8 and 9, a horizontal axis represents the transmission power in units of pu, and a vertical axis represents a simulation value of the efficiency of the power transmission. The efficiency is indicated by a ratio of the actual transmission power obtained by subtracting the loss power in power conversion device 100 from the input power from DC power supply 10.

FIG. 8 illustrates the simulation result in the case of V1>V2, and FIG. 9 illustrates the simulation result in the case of V2>V1.

Referring to FIG. 8, a solid line indicates the simulation result when the zero voltage period is provided to AC voltage VT1 using phase difference 61 calculated by equations (11), (12) according to the first embodiment in the case of V1>V2. On the other hand, a dotted line in FIG. 8 indicates the simulation result in the normal operation in which the zero voltage period is not provided in both AC voltages VT1 and VT2 in the case of V1>V2.

In the simulation of FIG. 8, in a region of P≤0.7 pu, the efficiency is higher in the case of providing the zero voltage period (solid line) than in the normal operation (dotted line). On the other hand, in the region of P>0.7 pu, the efficiency is lower in the case of providing the zero voltage period (solid line) than in the normal operation (dotted line).

Referring to FIG. 9, the solid line indicates the simulation result when zero voltage period ($\phi2+\delta2$) is provided to AC voltage VT2 using phase difference $\delta2$ calculated by equations (21b), (23) according to the second embodiment in the case of V2>V1. On the other hand, the dotted line in FIG. 9 indicates the simulation result in the normal operation in which the zero voltage period is not provided in both AC voltages VT1 and VT2 in the case of V2>V1.

In the simulation of FIG. 9, in the region of P≤0.7 pu, the efficiency is higher in the case of providing the zero voltage period (solid line) than in the normal operation (dotted line). On the other hand, in the region of P>0.7 pu, the efficiency is lower in the case of providing the zero voltage period (solid line) than in the normal operation (dotted line).

Through FIGS. 8 and 9, in the region where the transmission power is large (in the examples of FIGS. 8 and 9, P>0.7 pu), the efficiency is conversely reduced by providing the zero voltage period. It is considered that because the absolute value of the turn-off current increases as a result that the amplitude of alternating current IL with respect to the same transmission power increases due to the influence of the decrease in the power factor, so that the power loss increases in switching elements Q11 to Q14 and Q21 to Q24 of first bridge circuit 12 and second bridge circuit 22.

That is, in the region where the transmission power is large, the increase in the power loss due to the decrease in the power factor is larger than the reduction of the power loss provided with the zero voltage period, so that power conversion device 100 can be operated with higher efficiency by applying the normal operation.

On the other hand, in the region where the transmission power is small (in the examples of FIGS. 8 and 9, P≤0.7 pu), because alternating current IL does not increase so much even when the power factor decreases by providing the zero voltage period, so that power conversion device 100 can be operated with high efficiency because of the effect of reducing the switching loss by providing the zero voltage period.

Consequently, the power conversion device of the fourth embodiment executes the control to select whether to provide the zero voltage period in first bridge circuit 12 and second bridge circuit 22 depending on the transmission power. Boundary value 0.7 pu in FIGS. 8 and 9 is an example in the current simulation result and changes depending on circuit conditions and the like, but can be previously obtained by the similar simulation, the actual machine test, or the like.

Also in the fourth embodiment, the configuration of control circuit 50 can be similar to that of the third embodiment (FIG. 6). The fourth embodiment is different from the third embodiment (FIG. 7) in the control processing executed by phase difference arithmetic unit 51.

Figure 10:
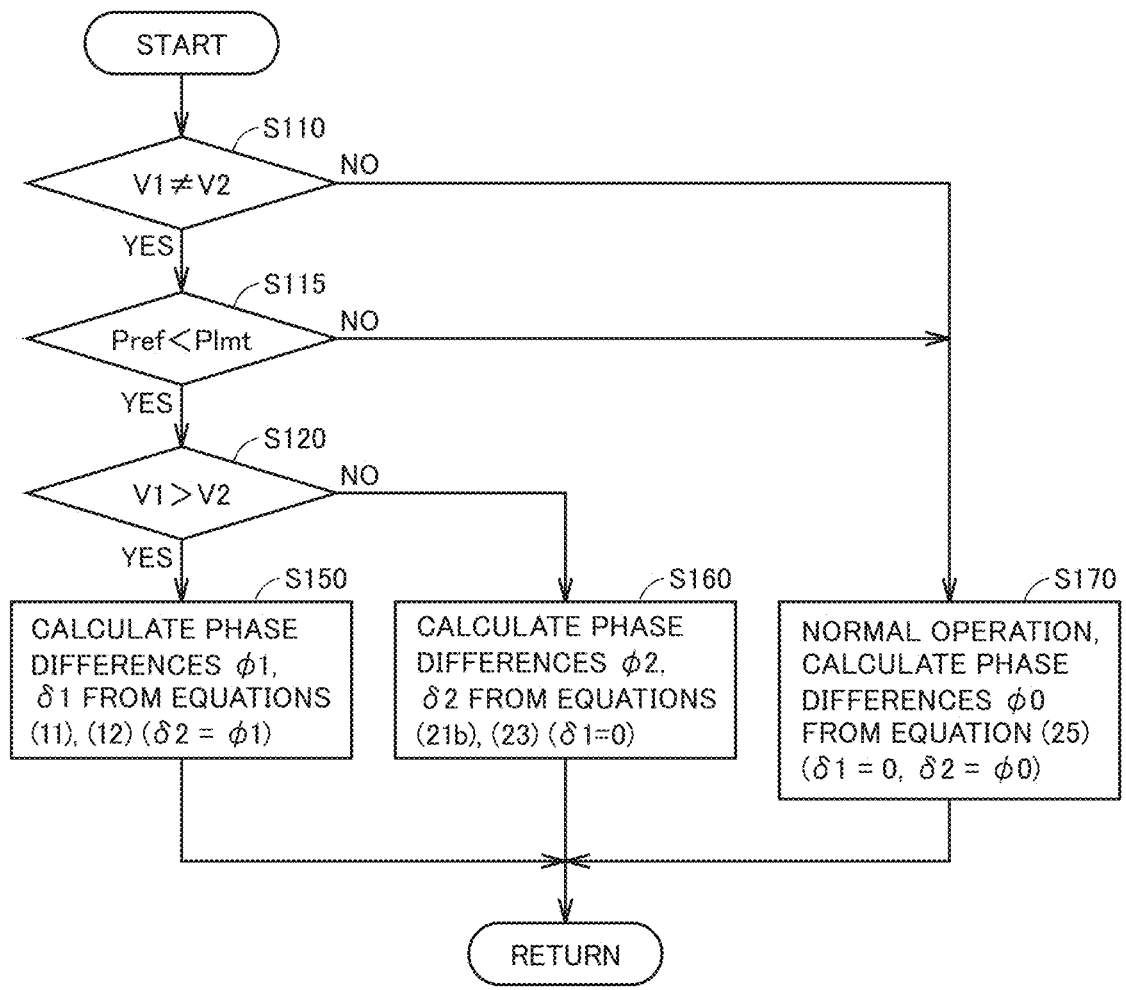
FIG. 10 is a flowchart illustrating control processing by a phase difference arithmetic unit in a control circuit of a power conversion device according to a fourth embodiment.

FIG. 10 is a flowchart illustrating the control processing executed by the phase difference arithmetic unit in the control circuit of the power conversion device of the fourth embodiment. The control processing illustrated in the flowchart of FIG. 10 can also be executed by software and/or hardware by the digital electronic circuit and/or the analog electronic circuit constituting control circuit 50.

Referring to FIG. 10, in the case of V1≠V2 (YES in S110), phase difference arithmetic unit 51 (control circuit 50) compares the transmission power with a predetermined boundary value Plim in S115. Boundary value Plim corresponds to 0.7 pu in FIGS. 8 and 9, and is previously set according to the simulation as described above, an actual machine test, or the like. For example, in S115, transmission power command value Pref and boundary value Plim are compared to each other.

In the case of Pref<Plim (YES in S115), phase difference arithmetic unit 51 (control circuit 50) calculates phase difference $\phi1$ or $\phi2$ and phase differences $\delta1$, $\delta2$ by S120, S150, and S160 similar to those in FIG. 7. Accordingly, similarly to the third embodiment, which one of AC voltages VT1 and VT2 is provided with the zero voltage period is controlled according to the level of DC voltages V1 and V2.

On the other hand, in the case of Pref≥Plim (NO in S115), phase difference arithmetic unit 51 (control circuit 50) calculates phase difference $\phi0$ and sets the phase difference $\delta1=0$ and $\delta2=\phi0$ by S170 similar to that in FIG. 7, similarly to the case of V1=V2 (NO in S110). As a result, in the region where transmission power P of P>0.7 pu is large in FIGS. 8 and 9, power conversion device 100 can be operated by the normal operation in which the zero voltage period is not provided in both AC voltages VT1 and VT2.

As described above, according to the power conversion device of the fourth embodiment, the efficiency of power conversion device 100 can be improved by appropriately switching whether to provide the zero voltage period in AC voltages VT1 and VT2 depending on the transmission power.

Fifth Embodiment

The control of appropriately switching the setting of the zero voltage period to AC voltages VT1, VT2 in accordance with the states of DC voltages V1, V2 is described in the third and fourth embodiments. However, for example, in spite of the fact that actually V1<V2 holds, when V1>V2 is determined from the detection value to provide the zero voltage period on the side of first bridge circuit 12 (AC voltage VT1), there is a concern that the power loss in switching elements Q11 to Q14 and Q21 to Q24 increases as described with reference to FIG. 4B. Consequently, in a fifth embodiment, control for preventing malfunction due to a detection error of DC voltages V1 and V2 will be described.

Also in the fourth embodiment, the configuration of control circuit 50 can be similar to that of the third embodiment (FIG. 6). In the fourth embodiment, the control processing executed by phase difference arithmetic unit 51 is different from that in the third or fourth embodiment (FIG. 10).

Figure 11:
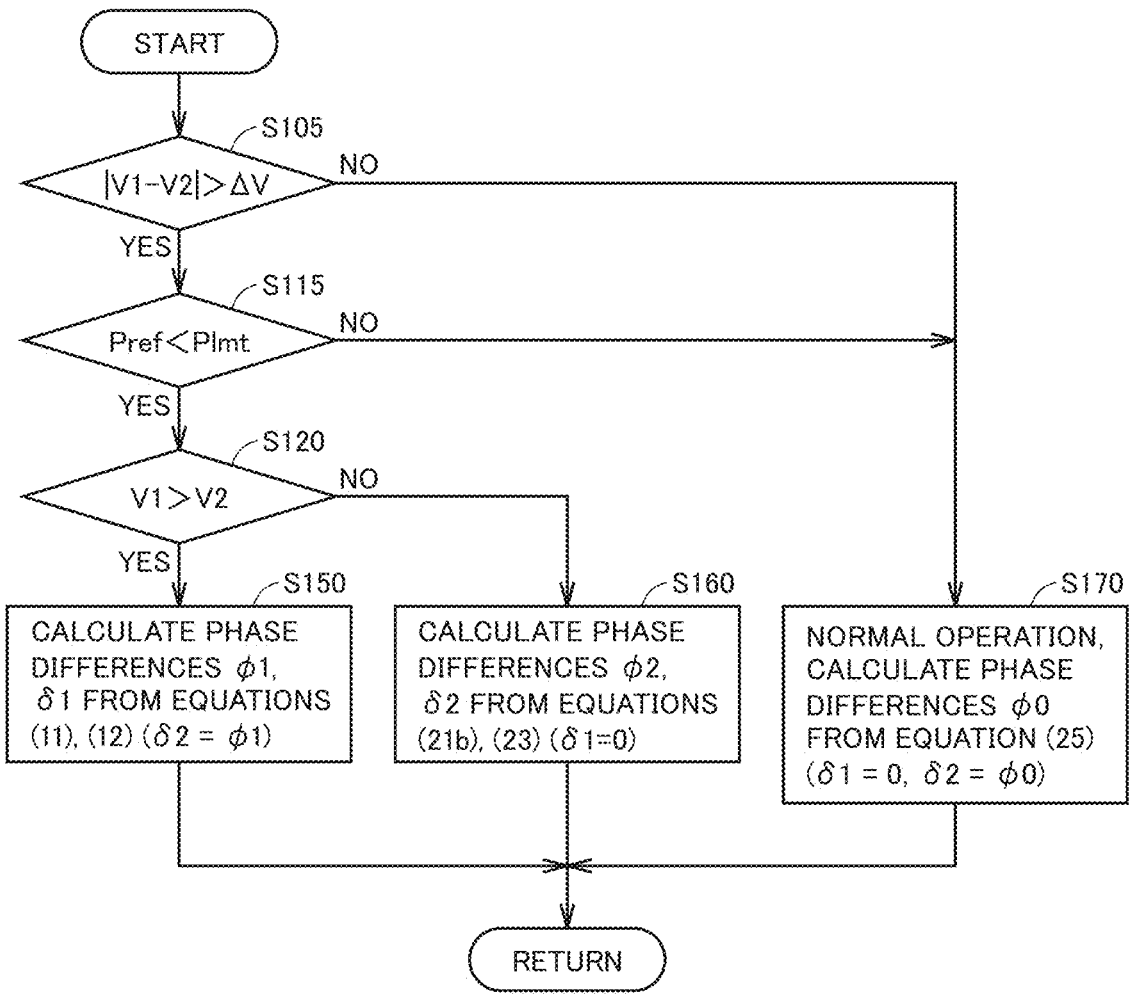
FIG. 11 is a flowchart illustrating control processing by a phase difference arithmetic unit in a control circuit of a power conversion device according to a fifth embodiment.

FIG. 11 is a flowchart illustrating the control processing executed by the phase difference arithmetic unit in the control circuit of the power conversion device of the fifth embodiment. The control processing illustrated in the flowchart of FIG. 11 can also be executed by software and/or hardware by the digital electronic circuit and/or the analog electronic circuit constituting control circuit 50.

Referring to FIG. 11, phase difference arithmetic unit 51 (control circuit 50) compares the detection values of DC voltages V1 and V2 in S105 instead of S110 in FIGS. 7 and 10. In S105, the absolute value (|V1−V2|) of the voltage difference between DC voltages V1 and V2 (detection value) is compared with a predetermined determination value ΔV. Determination value ΔV can be previously set while reflecting a test result or the like under an assumed operation condition at the time of designing power conversion device 100.

When |V1−V2|≤ΔV (NO in S105), phase difference arithmetic unit 51 (control circuit 50) calculates phase difference φ0 for the normal operation and sets phase difference δ1=0 and δ2=φ0 by S170 similar to FIGS. 7 and 10 similarly to the negative determination in S110 in FIGS. 7 and 10. As a result, when the difference between the detection values of DC voltages V1 and V2 is small, power conversion device 100 can be operated by the normal operation in which the zero voltage period is not provided in both AC voltages VT1 and VT2.

On the other hand, when |V1−V2|>ΔV (YES in S105), phase difference arithmetic unit 51 (control circuit 50) calculates phase difference φ1 or φ2 and phase differences δ1, δ2 by S115 to S160 similar to FIG. 10. Similarly to the third and fourth embodiments, which one of AC voltages VT1 and VT2 is provided with the zero voltage period is controlled in accordance with the level of DC voltages V1 and V2.

In FIG. 11, the control processing of replacing S110 with S105 in the control processing of FIG. 10 (fourth embodiment) is described. However, S110 of the control processing (control processing of FIG. 7) of the third embodiment can be replaced with S105 in the fifth embodiment.

As described above, according to the power conversion device of the fifth embodiment, power conversion device 100 can be operated in a mode in which the zero voltage period is not provided in both AC voltages VT1 and VT2 while there is a possibility of erroneously determining the level of DC voltages V1 and V2 due to an influence of the detection error. As a result, it is possible to prevent malfunction in which the power loss increases as described in FIGS. 4B and 5A by the determination of the level of DC voltages V1 and V2 opposite to the actual level due to the detection error.

Sixth Embodiment

The configuration in which the calculation by equations (11), (12), the calculation by equations (21b), (23), or the calculation by equation (25) is executed by phase difference arithmetic unit 51 of control circuit 50 based on detected DC voltages V1, V2 and transmission power command value Pref is exemplified in the first to fifth embodiments. In a sixth embodiment, a configuration example in which a reference table is used for at least a part of the processing of obtaining phase differences φ0 to φ2 and phase differences δ1, δ2 in order to reduce an arithmetic load in phase difference arithmetic unit 51 will be described.

Figure 12:
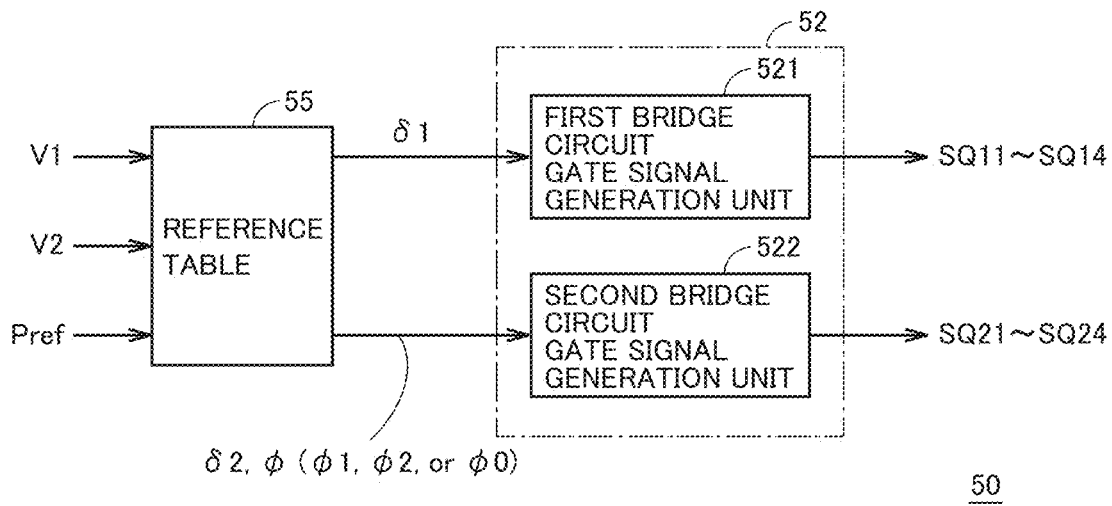
FIG. 12 is a block diagram illustrating a first configuration example of a control circuit of a power conversion device according to a sixth embodiment.

FIG. 12 is a block diagram illustrating a first configuration example of a control circuit of a power conversion device according to the sixth embodiment.

Referring to FIG. 12, in the first example of the sixth embodiment, control circuit 50 includes a reference table 55 and gate signal generation unit 52 similar to that in FIG. 6.

Similarly to phase difference arithmetic unit 51 of FIG. 6, reference table 55 is configured to output one of phase differences φ0 to φ2 and phase differences δ1, δ2 using detected DC voltages V1, V2 and transmission power command value Pref as arguments.

As described above, in the processing of FIGS. 7, 10, and 11, in each of S150 to S170, phase difference φ(one of φ0 to φ2) and phase differences δ1, δ2 are obtained using detected DC voltages V1, V2 and transmission power command value Pref in accordance with equations (11), (12), (21b), (23), or (25).

Furthermore, in the processing of FIGS. 7, 10, and 11, the selection of S150 to S170 is also executed based on DC voltages V1, V2, or DC voltages V1, V2 and transmission power command value Pref. Consequently, it is possible to distinguish which one of S150, S160, and S170 is selected in a three-dimensional region by a combination of DC voltage V1, DC voltage V2, and transmission power command value Pref.

As a result, reference table 55 can be configured to calculate any one of phase differences φ0 to φ2 and phase differences δ1, δ2 with DC voltage V1, DC voltage V2, and transmission power command value Pref as arguments along with the selection of S150 to S170 in the processing of FIGS. 7, 10, and 11. For example, phase difference φ1, δ1 and phase difference δ2 (δ2=φ2) in accordance with equations (11), (12) can be previously stored as a table value in the regions of DC voltage V1, DC voltage V2, and transmission power command value Pref in which S150 is selected. Similarly, it is possible to store previously phase differences φ2, δ2 (δ1=0) in accordance with equations (21b), (23) as a table value for the region in which S160 is selected, and to store previously phase difference φ0 in accordance with equation (25) and phase differences δ1 and δ2 (δ1=0, δ2=φ0) as a table value for the region in which S170 is selected.

In this manner, similarly to phase difference arithmetic unit 51 of FIG. 6, reference table 55 can transmit phase difference δ1 to first bridge circuit signal generation unit 521 and transmit phase difference φ(phase difference φ0, φ1, or φ2) and phase difference δ2 for power transmission control to second bridge circuit signal generation unit 522 with respect to the inputs of detected DC voltages V1, V2 and transmission power command value Pref.

As a result, as described with reference to FIG. 6, first bridge circuit signal generation unit 521 and second bridge circuit signal generation unit 522 can generate gate signals SQ11 to SQ14, SQ21 to SQ24 of switching elements Q11 to Q14, Q21 to Q24.

With such a configuration, the arithmetic load in control circuit 50 can be reduced, and control circuit 50 can be simplified.

Figure 13:
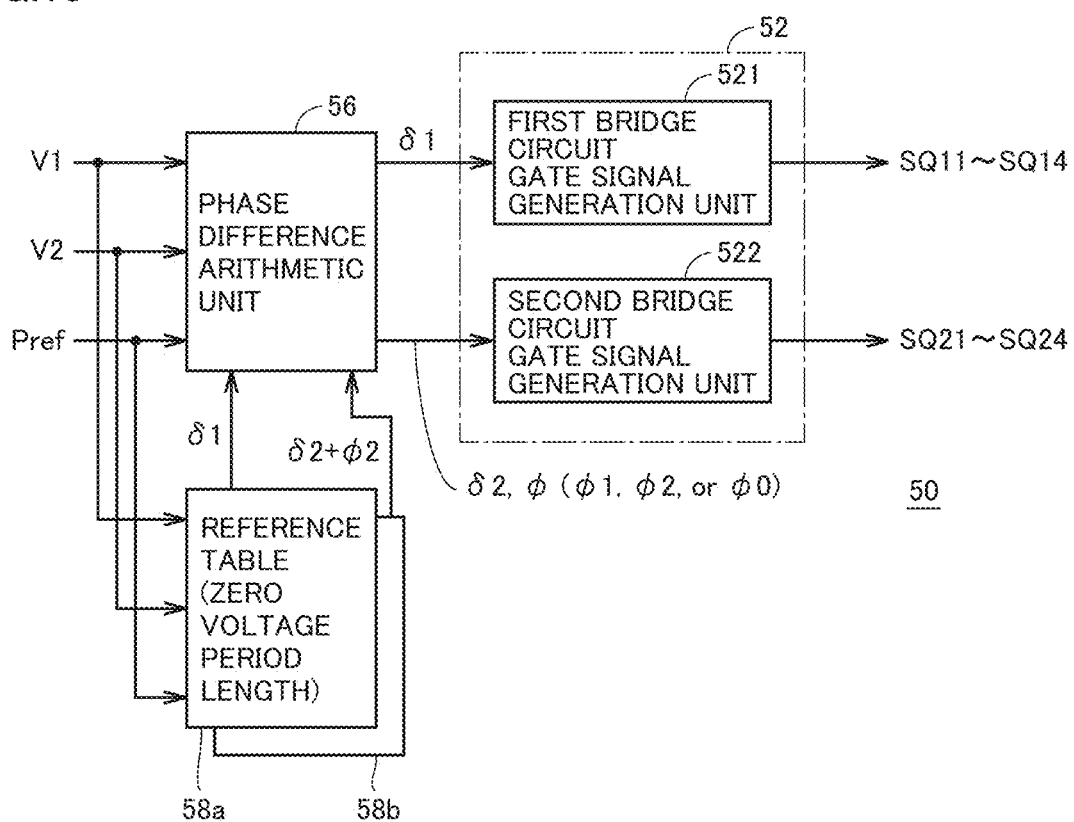
FIG. 13 is a block diagram illustrating a second configuration example of the control circuit of the power conversion device of the sixth embodiment.

FIG. 13 is a block diagram illustrating a second configuration example of the control circuit of the power conversion device according to the sixth embodiment.

Referring to FIG. 13, in the second configuration example according to the sixth embodiment, control circuit 50 includes a phase difference arithmetic unit 56, reference tables 58a, 58b, and gate signal generation unit 52 similar to that in FIG. 6. In the first configuration example, because all the functions of phase difference arithmetic unit 51 (FIG. 6) are tabulated, there is a concern that the capacity of reference table 55 increases. Consequently, a part of the functions of phase difference arithmetic unit 51 in FIG. 6 is tabulated in the second configuration example.

Reference table 58a is configured to provide the zero voltage period in first bridge circuit 12, namely, to obtain the zero voltage period length in the first embodiment as a part of the processing in S150 of FIGS. 7, 10, and 11. Specifically, reference table 58a is configured to store previously the value of phase difference δ1 in accordance with equation (11) using detected DC voltages V1, V2 and transmission power command value Pref as arguments.

Reference table 58b is configured to provide the zero voltage period in second bridge circuit 22, namely, to obtain the zero voltage period length in the second embodiment in the second embodiment as a part of the processing in S160 of FIGS. 7, 10, and 11. Specifically, reference table 58b is configured to store previously the value of phase difference (φ2+δ2) in accordance with equation (21b) using detected DC voltages V1, V2 and transmission power command value Pref as arguments.

Phase difference arithmetic unit 56 is configured to execute the processing of selecting S150 to S170 in FIGS. 7, 10, and 11, the remaining processing of S150, the remaining processing of S160, and the processing of S170.

In the state in which S150 is selected, phase difference arithmetic unit 56 calculates the phase difference φ1 by calculation in accordance with equation (12) and sets phase difference δ2=φ1. In the state in which S170 is selected, phase difference arithmetic unit 56 calculates phase difference φ0 by calculation in accordance with equation (25) and sets phase difference δ1=0 and phase difference δ2=φ0.

Furthermore, in the state in which S160 is selected, phase difference arithmetic unit 56 calculates phase difference φ2 by calculation in accordance with equation (23) and sets phase difference δ1=0. Furthermore, phase difference δ2 can be calculated by subtracting calculated phase difference φ2 from zero voltage period length (φ2+δ2) of reference table 58b.

As a result, by the combination of phase difference arithmetic unit 56 and reference tables 58a, 58b, functions similar to those of phase difference arithmetic unit 51 in FIG. 6 can be executed to calculate phase difference φ(φ0, φ1, or φ2) and the phase differences δ1, δ2.

Consequently, similarly to FIG. 6, gate signals SQ11 to SQ14, SQ21 to SQ24 of switching elements Q11 to Q14, Q21 to Q24 can be generated by first bridge circuit signal generation unit 521 and second bridge circuit signal generation unit 522.

With such a configuration, control circuit 50 can be simplified by balancing the reduction of the arithmetic load and the suppression of the increase in capacity of the table.

In the present embodiments, the power transmission from DC power supply 10 to load 20, namely, the power transmission from first bridge circuit 12 to second bridge circuit 22 is described. However, as is clear from the symmetry of the circuit, the same control can be executed in the opposite direction to the above, namely, the power transmission from second bridge circuit 22 to first bridge circuit 12. Specifically, the power transmission in the opposite direction can be similarly controlled by inverting a phase delay and advance between the gate signal of the switching element of first bridge circuit 12 and the gate signal of second switching element.

In short, in the symmetrical configuration in which the bridge circuit is connected to each of the primary side and the secondary side of transformer 40, the bidirectional power transmission can be dealt with by applying the control described in the present embodiments while the power transmission side is set to the primary side and the power reception side is set to the secondary side.

It should be considered that the disclosed embodiment is an example in all respects and not restrictive. The scope of the present invention is defined by not the description above, but the claims, and it is intended that all modifications within the meaning and scope of the claims are included in the present invention.

REFERENCE SIGNS LIST

10: DC power supply, 11: first DC terminal, 12: first bridge circuit, 13: first AC terminal, 20: load, 21: second DC terminal, 22: second bridge circuit, 23: second AC terminal, 40: transformer, 41: primary-side-winding (transformer), 42: secondary-side-winding (transformer), 50: control circuit, 51, 56: phase difference arithmetic unit, 52: gate signal generation unit, 55, 58a, 58b: reference table, 100: power conversion device, 521: first bridge circuit signal generation unit, 522: second bridge circuit signal generation unit, Cdc1, Cdc2: DC capacitor, Cs: snubber capacitor, IL: alternating current (transformer), Lt: inductance element, NL1, NL2, PL1, PL2: power line, Q11 to Q14, Q21 to Q24: semiconductor switching element, SQ11 to SQ14, SQ21 to SQ24: gate signal (semiconductor switching element), V1: first DC voltage, V2: second DC voltage, VT1: first AC voltage, VT2: second AC voltage

The invention claimed is:

1. A power conversion device including a first DC terminal and a second DC terminal, the power conversion device comprising:
   a transformer including a first winding and a second winding that are magnetically coupled;
   a first bridge circuit connected between the first DC terminal and a first AC terminal connected to the first winding, the first bridge circuit executing power conversion between a first DC voltage of the first DC terminal and a first AC voltage of the first AC terminal;
   a second bridge circuit connected between the second DC terminal and a second AC terminal connected to the second winding, the second bridge circuit executing power conversion between a second DC voltage of the second DC terminal and a second AC voltage of the second AC terminal,
   each of the first and second bridge circuits including a plurality of switching legs connected in parallel,
   each of the plurality of switching legs including:
      a positive-side switching element and a negative-side switching element connected in series; and
      a snubber capacitor connected in parallel to each of the positive-side switching element and the negative-side switching element; and
      a control circuit to control on and off of each of the positive-side switching elements and each of the negative-side switching elements in the first and second bridge circuits, wherein
   the control circuit alternately turns on and off the positive-side switching element and the negative-side switching element after a dead time having a predetermined length is provided in each of the switching legs, the power conversion device has a first operation mode in which power transmission is executed between the first DC terminal and the second DC terminal, in the first operation mode, the control circuit controls on and off of each of the positive- side switching elements and each of the negative-side switching elements of the first and second bridge circuits so that a first phase difference between switching phases of the first bridge circuit and the second bridge circuit is provided in order to control transmission power, and a zero voltage period is provided in one of the first AC voltage and the second AC voltage, while the zero voltage period is not provided in the other of the first AC voltage and the second AC voltage, and in the first operation mode, a length of the zero voltage period is determined such that charging and discharging of the snubber capacitor are completed during the dead time in each of the switching legs of one of the first and second bridge circuits that outputs the other of the first AC voltage and the second AC voltage, wherein, in the first operation mode, the control circuit obtains a first current value completing the charging and discharging of the snubber capacitor during the dead time as a zero volt switching current value, using an inductance value of an inductance element between the transformer and the first bridge circuit or the second bridge circuit, a capacitance value of the snubber capacitor, and a converted value of the second DC voltage on the side of the first winding or the first DC voltage, and sets the length of the zero voltage period in accordance with a predetermined first arithmetic expression including the zero volt switching current value, switching frequencies of the positive-side switching element and the negative-side switching element, the first DC voltage, the converted values of the second DC voltage on the side of the first winding, and the inductance value.

2. The power conversion device according to claim 1, wherein, in the first operation mode, the control circuit controls on and off of each of the positive-side switching elements and each of the negative-side switching elements of the first and second bridge circuits so that in one of the first and second bridge circuits that outputs the one of the first AC voltage and the second AC voltage, a second phase difference is provided in an on and off phase in which the on and off of the positive-side switching element and the negative-side switching element is switched, between the plurality of switching legs, and in the other of the first and second bridge circuits that outputs the other of the first AC voltage and the second AC voltage, the on and off phase is identical between the plurality of switching legs, and the second phase difference is set in accordance with the length of the zero voltage period.

3. The power conversion device according to claim 1, wherein, in the first operation mode, when a detection value of the first DC voltage is higher than a converted value of a detection value of the second DC voltage on a side of the first winding, the control circuit controls on and off of each of the positive-side switching elements and each of the negative-side switching elements of the first and second bridge circuits so as to provide the zero voltage period in the first AC voltage, and so as not to provide the zero voltage period in the second AC voltage.

4. The power conversion device according to claim 1, wherein, in the first operation mode, when a detection value of the first DC voltage is lower than a converted value of a detection value of the second DC voltage on a side of the first winding, the control circuit controls on and off of each of the positive-side switching elements and each of the negative-side switching elements of the first and second bridge circuits so as to provide the zero voltage period in the second AC voltage, and so as not to provide the zero voltage period in the first AC voltage.

5. The power conversion device according to claim 1, wherein the power conversion device further has a second operation mode in the power transmission between the first DC terminal and the second DC terminal, and the control circuit controls the on and off of each of the positive-side switching elements and each of the negative-side switching elements of the first and second bridge circuits so as to provide the first phase difference between the first AC voltage and the second AC voltage without providing the zero voltage period in both the first AC voltage and the second AC voltage in power transmission between the first DC terminal and the second DC terminal in the second operation mode, and applies the second operation mode when the transmission power is higher than a predetermined boundary value while applying the first operation mode when the transmission power is lower than the boundary value.

6. The power conversion device according to claim 1, wherein the power conversion device further has a second operation mode in power transmission between the first DC terminal and the second DC terminal, and the control circuit controls the on and off of each of the positive-side switching elements and each of the negative-side switching elements of the first and second bridge circuits so as to provide the first phase difference between the first AC voltage and the second AC voltage without providing the zero voltage period in both the first AC voltage and the second AC voltage in the power transmission between the first DC terminal and the second DC terminal in the second operation mode, and applies the second operation mode when an absolute value of a difference between the detection value of the first DC voltage and the converted value of the detection value of the second DC voltage on the side of the first winding is smaller than a predetermined determination value while applying the first operation mode when the absolute value is larger than the determination value.

7. The power conversion device according to claim 6, wherein the control circuit preferentially applies the first operation mode when the transmission power is lower than a predetermined boundary value, and applies the second operation mode when the transmission power is higher than the boundary value.

8. The power conversion device according to claim 1, wherein, in the first operation mode, the control circuit obtains a second current value completing the charging and discharging of the snubber capacitor during the dead time as a zero volt switching current value, using the dead time, a capacitance value of the snubber capacitor, and a converted value of the second DC voltage on the side of the first winding or the first DC voltage, and sets the length of the zero voltage period in accordance with a predetermined first arithmetic expression including the zero volt switching current value, switching frequency of the positive-side switching element and the negative-side switching element, the first DC voltage, a converted value of the second DC voltage on the side of the first winding, and an inductance value of an inductance element between the transformer and the first bridge circuit or the second bridge circuit.

9. The power conversion device according to claim 1, wherein, in the first operation mode, the control circuit obtains a second current value completing the charging and discharging of the snubber capacitor during the dead time, using the dead time, a capacitance value of the snubber capacitor, and a converted value of the second DC voltage on the side of the first winding or the first DC voltage, and sets the length of the zero voltage period by inputting a current maximum value of the first current value and the second current value as the zero volt switching current value to the first arithmetic expression.

10. The power conversion device according to claim 1, wherein, in the first operation mode, when the zero voltage period is provided in the first AC voltage, the control circuit calculates the first phase difference in accordance with a predetermined second arithmetic expression using the switching frequency, the transmission power, the first DC voltage, a converted value of the second DC voltage on the side of the first winding, and the length of the set zero voltage period.

11. The power conversion device according to claim 1, wherein, in the first operation mode, when the zero voltage period is provided in the second AC voltage, the control circuit calculates the first phase difference in accordance with a predetermined third arithmetic expression using the switching frequency, the transmission power, the first DC voltage, a converted value of the second DC voltage on the side of the first winding, the inductance value, and the zero volt switching current value.

12. The power conversion device according to claim 1, wherein the control circuit executes at least a part of processing of obtaining the length of the zero voltage period and the first phase difference by referring to a previously-produced table using the first DC voltage, a converted value of the second DC voltage on the side of the first winding, and a command value of the transmission power as an argument.

13. A power conversion device including a first DC terminal and a second DC terminal, the power conversion device comprising:
a transformer including a first winding and a second winding that are magnetically coupled;
a first bridge circuit connected between the first DC terminal and a first AC terminal connected to the first winding, the first bridge circuit executing power conversion between a first DC voltage of the first DC terminal and a first AC voltage of the first AC terminal;
a second bridge circuit connected between the second DC terminal and a second AC terminal connected to the second winding, the second bridge circuit executing power conversion between a second DC voltage of the second DC terminal and a second AC voltage of the second AC terminal,
each of the first and second bridge circuits including a plurality of switching legs connected in parallel,
each of the plurality of switching legs including:
a positive-side switching element and a negative-side switching element connected in series; and
a snubber capacitor connected in parallel to each of the positive-side switching element and the negative-side switching element; and
a control circuit to control on and off of each of the positive-side switching elements and each of the negative-side switching elements in the first and second bridge circuits, wherein the control circuit alternately turns on and off the positive-side switching element and the negative-side switching element after a dead time having a predetermined length is provided in each of the switching legs, the power conversion device has a first operation mode in which power transmission is executed between the first DC terminal and the second DC terminal, in the first operation mode, the control circuit controls on and off of each of the positive-side switching elements and each of the negative-side switching elements of the first and second bridge circuits so that
a first phase difference between switching phases of the first bridge circuit and the second bridge circuit is provided in order to control transmission power,
a zero voltage period is provided in one of the first AC voltage and the second AC voltage, while the zero voltage period is not provided in the other of the first AC voltage and the second AC voltage, in the first operation mode, a length of the zero voltage period is determined such that charging and discharging of the snubber capacitor are completed during the dead time in each of the switching legs of one of the first and second bridge circuits that outputs the other of the first AC voltage and the second AC voltage, and wherein, in the first operation mode, the control circuit obtains a second current value completing the charging and discharging of the snubber capacitor during the dead time as a zero volt switching current value, using the dead time, a capacitance value of the snubber capacitor, and a converted value of the second DC voltage on the side of the first winding or the first DC voltage, and sets the length of the zero voltage period in accordance with a predetermined first arithmetic expression including the zero volt switching current value, switching frequency of the positive-side switching element and the negative-side switching element, the first DC voltage, a converted value of the second DC voltage on the side of the first winding, and an inductance value of an inductance element between the transformer and the first bridge circuit or the second bridge circuit.

14. The power conversion device according to claim 13, wherein,
in the first operation mode, the control circuit controls on and off of each of the positive-side switching elements and each of the negative-side switching elements of the first and second bridge circuits so that
in one of the first and second bridge circuits that outputs the one of the first AC voltage and the second AC voltage, a second phase difference is provided in an on and off phase in which the on and off of the positive-side switching element and the negative-side switching element is switched, between the plurality of switching legs, and
in the other of the first and second bridge circuits that outputs the other of the first AC voltage and the second AC voltage, the on and off phase is identical between the plurality of switching legs, and
the second phase difference is set in accordance with the length of the zero voltage period.

15. The power conversion device according to claim 13, wherein, in the first operation mode, when a detection value of the first DC voltage is higher than a converted value of a detection value of the second DC voltage on a side of the first winding, the control circuit controls on and off of each of the positive-side switching elements and each of the negative-side switching elements of the first and second bridge circuits so as to provide the zero voltage period in the first AC voltage, and so as not to provide the zero voltage period in the second AC voltage.

16. The power conversion device according to claim 13, wherein, in the first operation mode, when a detection value of the first DC voltage is lower than a converted value of a detection value of the second DC voltage on a side of the first winding, the control circuit controls on and off of each of the positive-side switching elements and each of the negative-side switching elements of the first and second bridge circuits so as to provide the zero voltage period in the second AC voltage, and so as not to provide the zero voltage period in the first AC voltage.

17. The power conversion device according to claim 13, wherein
the power conversion device further has a second operation mode in the power transmission between the first DC terminal and the second DC terminal, and
the control circuit controls the on and off of each of the positive-side switching elements and each of the negative-side switching elements of the first and second bridge circuits so as to provide the first phase difference between the first AC voltage and the second AC voltage without providing the zero voltage period in both the first AC voltage and the second AC voltage in power transmission between the first DC terminal and the second DC terminal in the second operation mode, and applies the second operation mode when the transmission power is higher than a predetermined boundary value while applying the first operation mode when the transmission power is lower than the boundary value.

18. The power conversion device according to claim 13, wherein
the power conversion device further has a second operation mode in power transmission between the first DC terminal and the second DC terminal, and
the control circuit controls the on and off of each of the positive-side switching elements and each of the negative-side switching elements of the first and second bridge circuits so as to provide the first phase difference between the first AC voltage and the second AC voltage without providing the zero voltage period in both the first AC voltage and the second AC voltage in the power transmission between the first DC terminal and the second DC terminal in the second operation mode, and applies the second operation mode when an absolute value of a difference between the detection value of the first DC voltage and the converted value of the detection value of the second DC voltage on the side of the first winding is smaller than a predetermined determination value while applying the first operation mode when the absolute value is larger than the determination value.

19. The power conversion device according to claim 18, wherein the control circuit preferentially applies the first operation mode when the transmission power is lower than a predetermined boundary value, and applies the second operation mode when the transmission power is higher than the boundary value.

* * * * *